(12) United States Patent
Ogawa et al.

(10) Patent No.: US 8,307,171 B2
(45) Date of Patent: Nov. 6, 2012

(54) STORAGE CONTROLLER AND STORAGE CONTROL METHOD FOR DYNAMICALLY ASSIGNING PARTIAL AREAS OF POOL AREA AS DATA STORAGE AREAS

(75) Inventors: Junji Ogawa, Sagamihara (JP); Yoichi Mizuno, Yokohama (JP); Yoshinori Ohira, Kawasaki (JP); Kenta Shiga, Yokohama (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 256 days.

(21) Appl. No.: 12/663,734

(22) PCT Filed: Oct. 27, 2009

(86) PCT No.: PCT/JP2009/005671
§ 371 (c)(1),
(2), (4) Date: Dec. 9, 2009

(87) PCT Pub. No.: WO2011/052005
PCT Pub. Date: May 5, 2011

(65) Prior Publication Data
US 2011/0231605 A1   Sep. 22, 2011

(51) Int. Cl.
*G06F 12/14* (2006.01)

(52) U.S. Cl. .................. 711/154; 711/114; 711/E12.007

(58) Field of Classification Search .................. 711/114, 711/154, E12.006, E12.007
See application file for complete search history.

(56) References Cited

U.S. PATENT DOCUMENTS

| | | | |
|---|---|---|---|
| 7,162,576 B2 * | 1/2007 | Mizuno et al. ................. | 711/112 |
| 8,032,701 B1 * | 10/2011 | Glade et al. .................... | 711/114 |
| 2005/0044140 A1 | 2/2005 | Urabe | |
| 2006/0282485 A1 * | 12/2006 | Aggarwal et al. ............. | 707/206 |
| 2007/0168634 A1 | 7/2007 | Morishita et al. | |
| 2008/0082748 A1 * | 4/2008 | Liu et al. ........................ | 711/114 |
| 2008/0082778 A1 * | 4/2008 | Inoue et al. .................... | 711/170 |
| 2008/0301385 A1 * | 12/2008 | Nagata et al. ................. | 711/162 |

FOREIGN PATENT DOCUMENTS

| | | | |
|---|---|---|---|
| EP | 2 085 868 A2 | 8/2009 | |
| EP | 2 104 028 A2 | 9/2009 | |
| JP | 2007-193573 A | 8/2007 | |

* cited by examiner

*Primary Examiner* — Charles Rones
*Assistant Examiner* — Hal Schnee
(74) *Attorney, Agent, or Firm* — Mattingly & Malur, PC

(57) ABSTRACT

A plurality of CPU cores each have control rights for logical storage areas of one or more types among logical storage areas of a plurality of types. As a source for an area to be assigned to the logical storage areas, a physical storage area which is common to the logical storage areas of the plurality of types is managed. In the case of a data access to a logical storage area corresponding to the control rights of the CPU core, the respective CPU core assigns an area required to store the data from the common physical storage area.

17 Claims, 24 Drawing Sheets

| | | | | 1202 |
|---|---|---|---|---|
| CONTROL RIGHTS SET MANAGEMENT INFORMATION | | | | |
| | | | | T1401 |
| CONTROL RIGHTS SET NUMBER | MANAGING CPU CORE NUMBER | BELONGING LUNs | ASSIGNED CHUNK NUMBERS | |
| 0 | 0 | 0, 1, 2 | 0, 3, 15, 46, 95 | |
| 1 | 0 | 3 | 23, 44, 86 | |
| 2 | 2 | 4 | 12, 54, 74, 93 | |
| 3 | 1 | 3 | 57 | |
| ⋮ | | | | |

CONTROL INFORMATION

POOL LU INFORMATION

| PLU | APPLI-CATION | TYPE | ULU | CAPACI-TY | USED CAPAC-ITY | START THRESH-OLD VALUE | END THRESH-OLD VALUE |
|---|---|---|---|---|---|---|---|
| 3 | VIR-TUAL | NOR-MAL | – | 30TB | 20TB | 100% | 90% |
| 5 | SNAP-SHOT | NOR-MAL | – | 40TB | 30TB | 95% | 90% |
| 13 | SNAP-SHOT | VIR-TUAL | 3 | 20TB | 5TB | 80% | 70% |
| 14 | SNAP-SHOT | VIR-TUAL | 3 | 20TB | 10TB | 90% | 90% |

⋮

POOL USAGE LU INFORMATION

| LUN | ULU | APPLICATION | PRIORITY |
|---|---|---|---|
| 2 | 3 | VIRTUAL | A |
| 11 | 3 | VIRTUAL | C |
| 16 | 5 | SNAPSHOT | B |
| 20 | 13 | SNAPSHOT | A |
| 35 | 13 | SNAPSHOT | D |
| 52 | 14 | SNAPSHOT | E |

POOL USAGE LU INFORMATION

| LUN | RANGE | CONTROL RIGHTS SET NUMBER | APPLICATION | PAGE ASSIGN POLICY |
|---|---|---|---|---|
| 0 | ALL | 0 | VIRTUAL | UNDELETABLE, LOCKED AT HIGH SPEED |
| 1 | ALL | 0 | SNAPSHOT | UNDELETABLE, LOCKED AT MEDIUM SPEED |
| 2 | ALL | 0 | SNAPSHOT | DELETABLE AT OVERFLOW, 4KB UNIT, ATTRIBUTE, CHANGEABLE FOR ACCESS FREQUENCY |
| 3 | 0~20TB | 1 | VIRTUAL | UNDELETABLE, LOW SPEED |
| 3 | 20TB~100TB | 3 | VIRTUAL | UNDELETABLE, MEDIUM SPEED |
| 4 | ALL | 2 | SNAPSHOT | DELETABLE AT OVERFLOW, MEDIUM SPEED |

Fig.13

CONTROL RIGHTS SET MANAGEMENT INFORMATION 1202

T1401

| CONTROL RIGHTS SET NUMBER | MANAGING CPU CORE NUMBER | BELONGING LUNs | ASSIGNED CHUNK NUMBERS |
|---|---|---|---|
| 0 | 0 | 0, 1, 2 | 0, 3, 15, 46, 95 |
| 1 | 0 | 3 | 23, 44, 86 |
| 2 | 2 | 4 | 12, 54, 74, 93 |
| 3 | 1 | 3 | 57 |

Fig.14

PAGE MANAGEMENT INFORMATION 1203

T1501

| PAGE NUMBER | APPLICATION | PAGE SIZE | PAGE USAGE LU NUMBERS | CHUNK NUMBER | ATTRIBUTE |
|---|---|---|---|---|---|
| 0 | SNAPSHOT | 64kB | 1,2 | 0 | A |
| 1 | VIRTUAL | 256kB | 0 | 0 | A |
| 2 | SNAPSHOT | 4kB | 2 | 0 | A |
| 3 | SNAPSHOT | 64kB | 1,2 | 0 | A |
| 4 | SNAPSHOT | 64kB | 1 | 0 | A |
| 105 | VIRTUAL | 64kB | 0, 2 | 3 | A |
| 211 | VIRTUAL | 64kB | 4 | 12 | D |
| 315 | VIRTUAL | 64kB | 0, 1 | 15 | A |
| 346 | SNAPSHOT | 4kB | 2 | 15 | B |

Fig.15

CHUNK MANAGEMENT INFORMATION ~1204

~T1601

| CHUNK NUMBER | RG NUMBER | ATTRIBUTE | FREE SPACE STATUS |
|---|---|---|---|
| 0 | 4 | A | NONE |
| 3 | 4 | A | FREE SPACE PRESENT 4kB, 96kB |
| 12 | 15 | D | FREE SPACE PRESENT 64kB |
| 15 | 4 | A | NONE |
| | 2 | B | FREE SPACE PRESENT 256kB, 4kB |
| 35 | 4 | A | FREE SPACE PRESENT, FULL AREA (32MB) |

Fig.16

ATTRIBUTE INFORMATION 1205

T1701

| ATTRIB-UTE | SUMMARY | FEATURES |
|---|---|---|
| A | SAS, RAID5, 4D+1P | MEDIUM SPEED |
| B | SATA, RAID6, 16D+2P | LOW SPEED, LOW COST, LOW RELIABILITY |
| C | SSD, RAID5, 4D+1P | HIGH SPEED, HIGH COST |
| D | EXTERNALLY COUPLED STORAGE SAS, RAID1+0, 2D+2D | MEDIUM SPEED, DELAYED RESPONSE, LOW COST, LOW RELIABILITY |

⋮

T1702

| PAGE NUMBER | CURRENT STATE ATTRIBUTE | PAGE STATE AND POLICY |
|---|---|---|
| 0 | A | NORMAL ACCESS, MAINTAIN CURRENT STATE |
| 2 | A | LOW FREQUENCY ACCESS, SWITCH TO LOW COST ATTRIBUTE RECOMMENDED |
| 211 | D | LOW FREQUENCY ACCESS, MAINTAIN CURRENT STATE |
| 346 | B | HIGH FREQUENCY ACCESS, SWITCH TO HIGH SPEED ATTRIBUTE RECOMMENDED |

STORAGE CONTROLLER AND STORAGE CONTROL METHOD FOR DYNAMICALLY ASSIGNING PARTIAL AREAS OF POOL AREA AS DATA STORAGE AREAS

TECHNICAL FIELD

The present invention generally relates to a storage control technology for dynamically assigning partial areas of a pool area as data storage areas.

BACKGROUND ART

As a storage controller, an apparatus that dynamically assigns partial areas of a pool area as data storage areas is known. A pool area is a physical storage area based on one or more RAID (Redundant Array of Independent Disks) groups, for example, which is an aggregate of one or a plurality of logical volumes, for example. A RAID group is configured by a plurality of physical storage devices, and a RAID group stores data at a predetermined RAID level. In the following description, the aforementioned physical storage area is called a 'pool area'.

There are several types of functions that use a pool area.

A first type of function is a dynamic capacity extension, for example. More specifically, in cases where a data storage area is actually required, such as when a write operation from a host to a logical volume (virtual volume) supplied to a host apparatus takes place, for example, a partial area of a pool area is assigned as a data storage area.

Furthermore, a second type of function is snapshot management, for example. In specific terms, an image of a logical volume at a certain time point, for example, is stored, and an area for storing data (differential data) corresponding to a difference between a stored image and a current image is dynamically assigned from the pool area.

In Patent Literature (PTL) 1, a method for improving the usage efficiency of a storage area by allowing a plurality of functions to share a centrally managed pool area is described.

CITATION LIST

Patent Literature

[PTL 1]
Japanese Patent Application Laid-open No. 2007-193573.

SUMMARY OF INVENTION

Technical Problem

Control of the parts in the storage controller and execution of programs implementing functions are executed by the CPU. There exist storage controllers that have a plurality of CPUs (Central Processing Units) provided in the storage controller, or storage controllers that are provided with a plurality of built-in CPU cores by mounting a plurality of CPU cores in the CPU.

In a storage controller with a plurality of built-in CPU cores, when access to the same physical and logical resources is shared between the CPU cores, the processing of the different cores must be mutually excluded, but the overhead from the exclusion processing results in a drop in processing performance. In particular, when a logical volume supplied to the host is used by a plurality of CPU cores, that is, when a plurality of cores are likely to perform processing simultaneously with respect to the same logical volume, there are cases where the plurality of CPU cores are unable to perform unrestricted processing such as access to the same logical address or access to a neighboring address using identical redundant data, which generates a lot of exclusion processing.

As a method of avoiding the overhead generated by this exclusion processing, there exists a method that involves pre-assigning physical and logical resources to be accessed to specific CPU cores. Where logical volumes supplied to the host are concerned, the need to exclude CPU cores other than the CPU core with control rights (in other words, ownership) can be obviated by assigning control rights that pertain to a certain logical volume to a certain CPU core so that processing with respect to this logical volume is executed by this CPU core alone. Note that the units for the control rights may be the logical volumes supplied to the host apparatus or logical storage areas distinct from the logical volumes.

However, when this method alone is adopted, in cases where a pool area includes one or a plurality of logical volumes and control rights are configured for each logical volume and each pool area, pool areas in a number equivalent to the number of CPU cores are required. Hence, even if capacity still remains in a certain pool area, when the capacity of another pool area is depleted, this causes a drop in capacity efficiency. This problem is considered to be serious when there is a mix of different types of functions using the pool area within a storage controller.

It is therefore an object of the present invention to suppress a drop in capacity efficiency in a storage controller in which a plurality of CPU cores each possess control rights relating to logical storage areas.

Solution to Problem

A plurality of CPU cores each have control rights to one or more types of logical storage area among a plurality of types of logical storage area. A physical storage area, which is common to logical storage areas of a plurality of types, is managed as a source for areas assigned to the logical storage areas. Each CPU core assigns, in a case where data is accessed to a logical storage area corresponding to the control rights of the CPU core, an area required to store the data from the common physical storage area.

Advantageous Effects of Invention

A drop in the capacity efficiency of a storage controller, in which a plurality of CPU cores each have control rights relating to logical storage areas, can be suppressed.

BRIEF DESCRIPTION OF DRAWINGS

FIG. 6 shows the composition of control information 231.

FIG. 13 shows the composition of pool usage LU information 1201.

FIG. 14 shows the composition of control rights set management information 1202.

FIG. 15 shows the composition of page management information 1203.

FIG. 16 shows the composition of chunk management information 1204.

FIG. 17 shows the composition of attribute information 1205.

DESCRIPTION OF EMBODIMENTS

Embodiments of the present invention will be described hereinbelow based on the drawings.

Example 1

Figure 1:
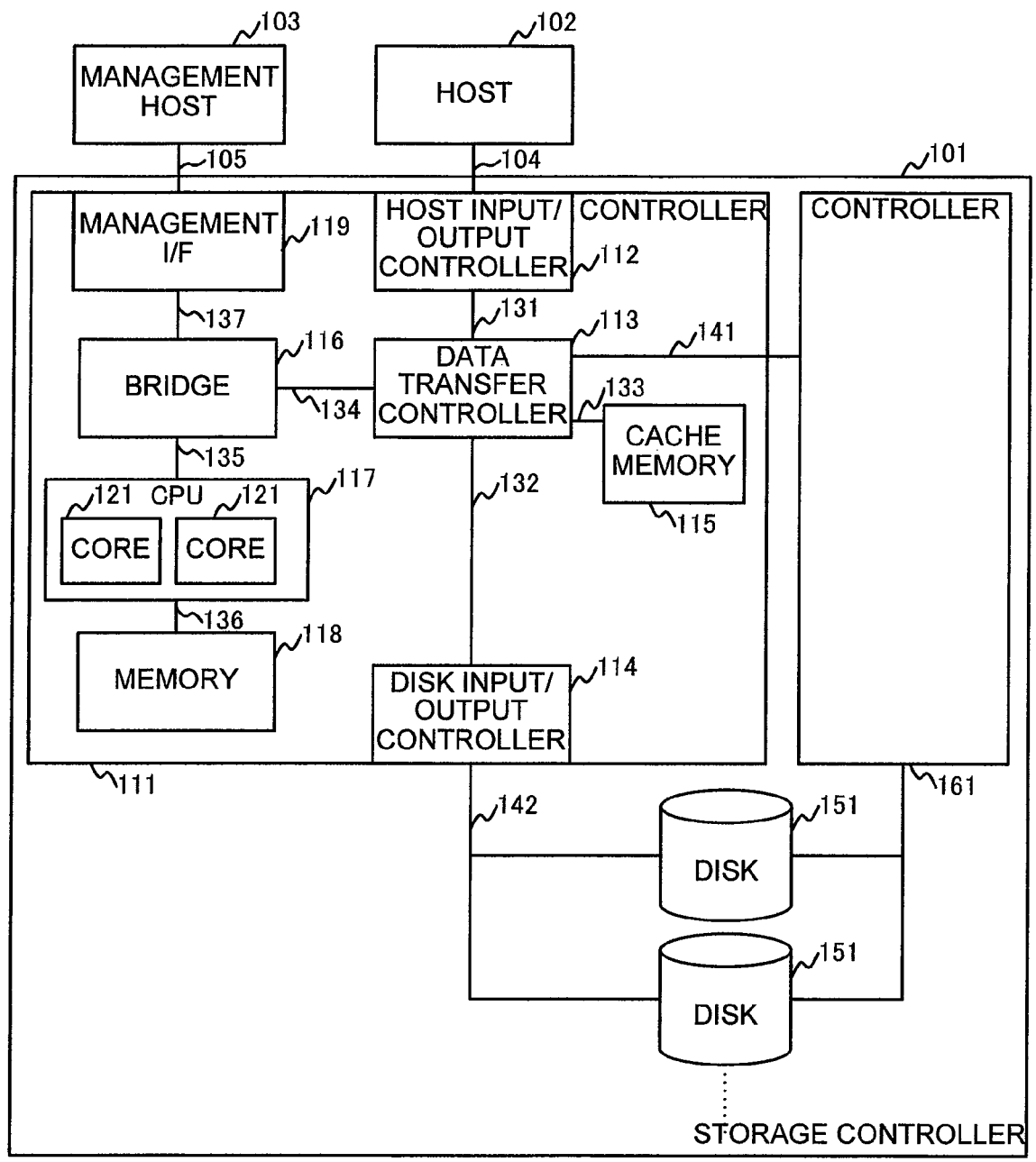
FIG. 1 is an overall configuration view of a computer system including a storage controller according to Example 1 of the present invention.

FIG. 1 is an overall configuration view of a computer system including a storage controller according to Example 1 of the present invention.

In FIG. 1, the computer system comprises a storage controller 101, a host 102, and a management host 103.

The host 102 is an apparatus (a computer or another storage controller, for example) that issues an I/O command (write command or read command) to the storage controller 101. The host 102 includes a communication port for coupling to the storage controller 101, and is coupled via this port and a coupling route 104 to the storage controller 101.

The management host 103 is an apparatus (a computer, for example) for managing the storage controller 101. The management host 103 is coupled to the storage controller 101 via a management coupling route 105.

In FIG. 1, a configuration in which the host 102 and the management host 103 are directly coupled to the storage controller 101 is illustrated, but a communication network (a SAN (Storage Area Network), for example) may be used to couple together the host 102 and the storage controller 101. A communication network (a LAN (Local Area Network), for example) may also be used to couple the management host 103 and the storage controller 101. Here, a Fibre Channel or iSCSI protocol or the like may be used for the SAN. The same coupling route as the host coupling can also be used for the management host coupling.

The storage controller 101 includes controllers 111 and 161, and a plurality of disks 151. The controllers 111 and 161 are coupled together by an intercontroller bus 141. The controllers 111 and 161 and the disks 151 are coupled by a disk coupling route 142. For the disks 151, HDD (Hard Disk Drives) such as FC (Fibre Channel), SAS (Serial Attached SCSI), ATA (Advanced Technology Attachment), or SSD (Solid State Drive) can be employed. Other types of physical storage devices, such as tape or flash memory, may also be adopted instead of the disks 151.

The controller 111 will now be described as a representative example of the controllers 111 and 161.

The controller 111 includes a host input/output controller 112, a data transfer controller 113, a disk input/output controller 114, a cache memory 115, a bridge 116, a CPU 117, a memory 118, and a management I/F 119.

The host input/output controller 112 is an interface apparatus which is coupled to the host 102 via the coupling route 104 and which performs control of inputs and outputs to and from the host 102.

The data transfer controller 113 is, for example, a hardware circuit (LSI, for example), which is coupled to the host input/output controller 112 by an internal bus 131, to the disk input/output controller 114 by an internal bus 132, and to the bridge 116 by an internal bus 134, for controlling data transfer in the controllers 111. Furthermore, the data transfer controller 113 is coupled to the controller 161, and controls the communication of control information between the controllers 111 and 116, as well as data transfers.

The disk input/output controller 114 is an interface device, for controlling data inputs and outputs with respect to the disks, which is coupled to the disks 151 by the disk coupling route 142.

The cache memory 115 is coupled to the data transfer controller 113 by the internal bus 133, and temporarily stores data migrated in a data transfer.

The memory 118 is coupled to the CPU 117 via an internal bus 136. The memory 118 stores computer programs executed by cores 121 in the CPU 117, and control information that is referred to the computer programs is executed.

The CPU 117 is coupled to the bridge 116 by an internal bus 135. Furthermore, the CPU 117 is a multi-core single processor, for example, or in other words comprises a plurality of the cores 121. Naturally, when the CPU 117 is a single core CPU, a plurality of cores are not stored, and the CPU 117 itself may be regarded as a single core. In this case, a plurality of CPU 117 are provided. The cores 121 execute various arithmetic processing in accordance with the programs stored in the memory 118, and execute overall control of the controller 111 based on the processing result. The cores 121 may also execute control of the resources in the controller 161.

The management I/F 119 is an interface device which is coupled to the bridge 116 by an internal bus 137. Furthermore, the management I/F 119 is coupled to the management host 103 via the management coupling route 105, and controls the exchange and communication of data with the management host 103.

The configuration of the storage controller 101 is not limited to that shown in FIG. 1. For example, a configuration using a chip integrating the CPU 117 and the bridge 116, a chip integrating the CPU 117 and the data transfer controller 113, or a chip integrating at least one interface device and the CPU 117 may also be adopted. A configuration in which the cache memory 115 and the memory 118 are implemented by the same memory may also be adopted.

Figure 2:
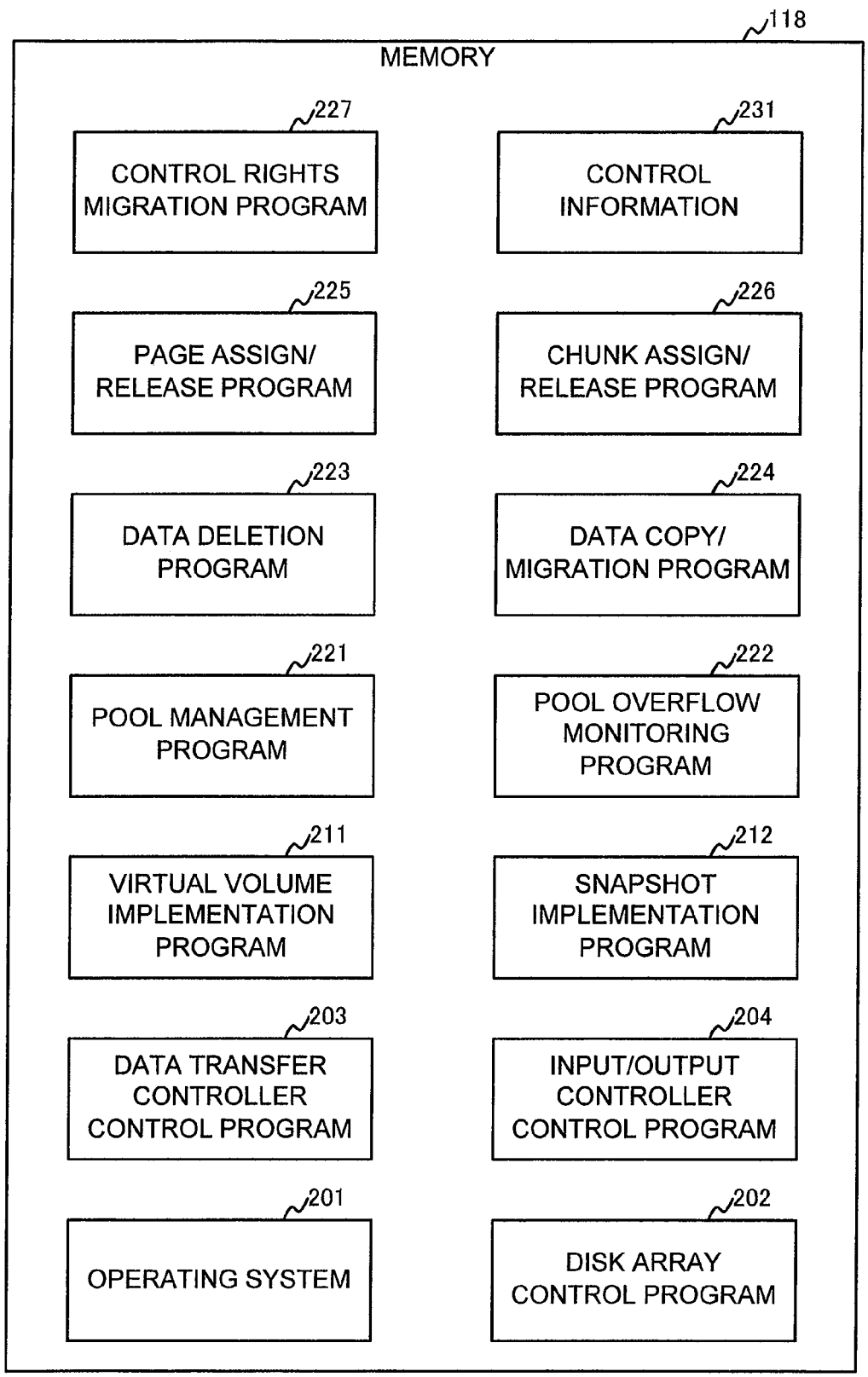
FIG. 2 shows programs and information stored in a memory 118.

FIG. 2 shows programs and information stored in the memory 118. Note that, in the following description, the processing executed by the programs is actually executed by the core executing the programs.

Although a lot of the information stored in the memory 118 is used in the processing of the CPU 117, information may also be used by the I/Fs (interfaces) between parts excluding the CPU. Although not shown in FIG. 2, there exists a usage method according to which information defining processing to be performed by the host input/output controller 112 is stored in the memory 118, the host input/output controller 112 performs post-processing to confirm this information, and the processing result is recorded in the memory 118. Furthermore, information used in the processing of the CPU 117 is for all the cores 121 in the CPU 117, or information for a specific core 121. In FIG. 2, all the information is shown shared between cores in order to simplify the description. However, areas accessed by each core are locked in order to reduce overhead due to inter-core exclusion processing, and therefore a configuration in which control information 231 is divided, for example, may also be adopted.

The memory 118 stores an operating system 201, a disk array control program 202, a data transfer controller control program 203, an input/output controller control program 204, a virtual volume implementation program 211, a snapshot implementation program 212, a pool management program 221, a pool overflow monitoring program 222, a data deletion program 223, a data copy/migration program 224, a page assign/release program 225, a chunk assign/release program 226, a control rights migration program 227, and the control information 231.

The operating system 201 is a program that performs basic processing such as scheduling when the CPU 117 and the cores 121 execute each program.

The disk array control program 202 is a program used in overall control of the storage controller such as management of logical volumes supplied to the host or the computation of input/output positions with respect to the disks 151.

The data transfer controller control program 203 is a program used in the control of the data transfer controller 113.

The input/output controller control program 204 is a program used in the control of the host input/output controller 112 and disk input/output controller 114.

The virtual volume implementation program 211 is a program for implementing a virtual volume function (thin provisioning capacity virtualization, for example). The virtual volume function is a function for dynamically securing a data area of a logical volume supplied to the host 102 from a pool area in the storage controller.

The snapshot implementation program 212 is a program for implementing a snapshot function. Here, the snapshot function is a function to acquire and store an image of a logical volume in the storage controller at a certain time point. A plurality of embodiments exist for the snapshot function but hereinbelow an embodiment in which logical volumes for a plurality of snapshot images and time points share the same data will be described. FIG. 2 illustrates only programs implementing the virtual volume function and the snapshot function but it is understood that a plurality of types of functions (described subsequently) which use a pool area are also possible. An example of such a function is the deduplication function. The deduplication function is a function for sharing data of the same content between one or a plurality of logical volumes and for storing real data in a pool area.

The pool management program 221 is a program for managing a pool area. A pool area is an area in which data, used by the aforementioned virtual volume function or the snapshot function, is actually stored.

The pool overflow monitoring program 222 is a program for monitoring whether data exceeding a predetermined size is to be stored in the pool area, or whether there is a high probability of such an event occurring.

The data deletion program 223 is a program used when deleting stored data and related management information in cases where cancelation from pool overflow is performed.

The data copy/migration program 224 is a program that mainly relates to data using the pool area and which is used when copying and migrating stored data to another location.

The page assign/release program 225 is a program for securing and releasing areas in page units. A 'page' is a partial area of the pool area, and a page unit is a management unit used by functions using the pool area.

The chunk assign/release program 226 is a program for securing and releasing area in chunk units. A 'chunk' is a storage area configured by a plurality of pages, and is a partial area of the pool area.

The control rights migration program 227 is a program which is used when migrating control rights assigned to a certain core 121 to another core.

The control information 231 stores the states and configuration of each physical resource and logical resource, which the cores 121 require upon executing the various programs.

Figure 3:
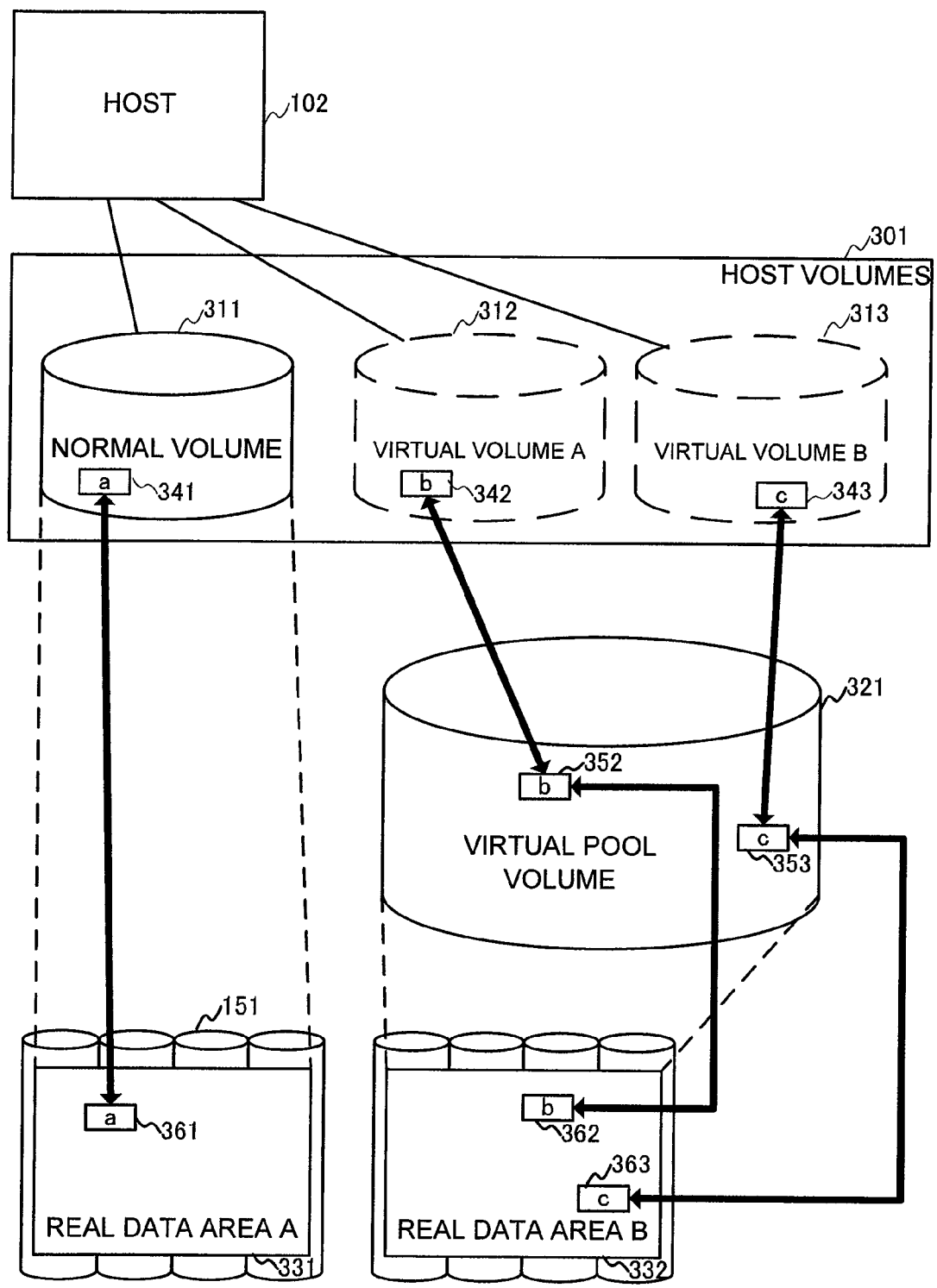
FIG. 3 is an explanatory diagram of a virtual volume function implemented by a virtual volume implementation program 211.

FIG. 3 is an explanatory diagram of the virtual volume function implemented by the virtual volume implementation program 211.

The storage controller 101 supplies logical volumes to the host 102. The logical volumes are host volumes 301. The host volumes 301 include a normal volume 311, a virtual volume A312, and a virtual volume B313, which are accessed by the host 102.

The normal volume 311 is the same size as the real data area A331 which actually stores the data, and is configured using disks 151, and is linked to the real data area A331 one-to-one. Hence, access by the host 102 to an area a341 in the normal volume 311 entails access to a corresponding area a361 in the real data area A331.

Meanwhile, the virtual volume A312 is a logical volume configured using the virtual volume function. The virtual volume A312 does not have real data and a data storage area assigned when the volume is created. In cases where access occurs, in particular write access to the virtual volume A312 by the host 102, a partial area of a real data storage area is assigned. The assigning of a data storage area is executed using part of a virtual pool volume (virtual volume function pool volume) 321. The virtual pool volume 321 is the same size as a real data area B332 configured by disks 151, and is linked to the real data area B332 one-to-one. Accordingly, access to a certain area b342 in the virtual volume A312 is first converted into access to an area b352 in the virtual pool volume 321. When the access to the area b342 at this time is the first access since creating the virtual volume A312, processing to newly assign the area b352 in the virtual pool volume 321 is executed. In addition, the area in which the data is actually stored is an area b362 in the real data area B332.

Furthermore, the virtual volume B313 is a logical volume configured using the virtual volume function, in the same way as the virtual volume A312. An area c343 in the virtual volume B313 corresponds to an area c353 in the virtual pool volume 321, and corresponds to an area c363 in the real data area B332. In other words, the virtual volume A312 and the virtual volume B313 are able to employ the pool volume 321 for the same virtual volume function.

The virtual volume function affords the effect that there is no need to design the size of the logical volumes supplied to the host, for example. It is hard to predict how the size required by the logical volumes used by the host will change in the future, and therefore creating large-sized logical volumes in advance is an effective method. However, when the logical volumes are created as normal volumes, a situation may arise where a large storage area is secured without being used. For this reason, a method whereby a real data area is assigned is preferable only in cases where a large-sized logical volume is created as a virtual volume and is actually accessed by the host.

When the virtual volume function is used for this purpose, the total size of the virtual volume need not match the total size of the virtual pool volume. The size of the virtual pool volume may be smaller, for example. For example, in the example of FIG. 3, even though the virtual volume A312 and the virtual volume B313 are each 100 TB, and the size of the virtual pool volume 321 is 20 TB, the virtual volume function is operable as long as the size actually used by the host 102 is equal to or less than the size of the virtual pool volume 321.

Figure 4:
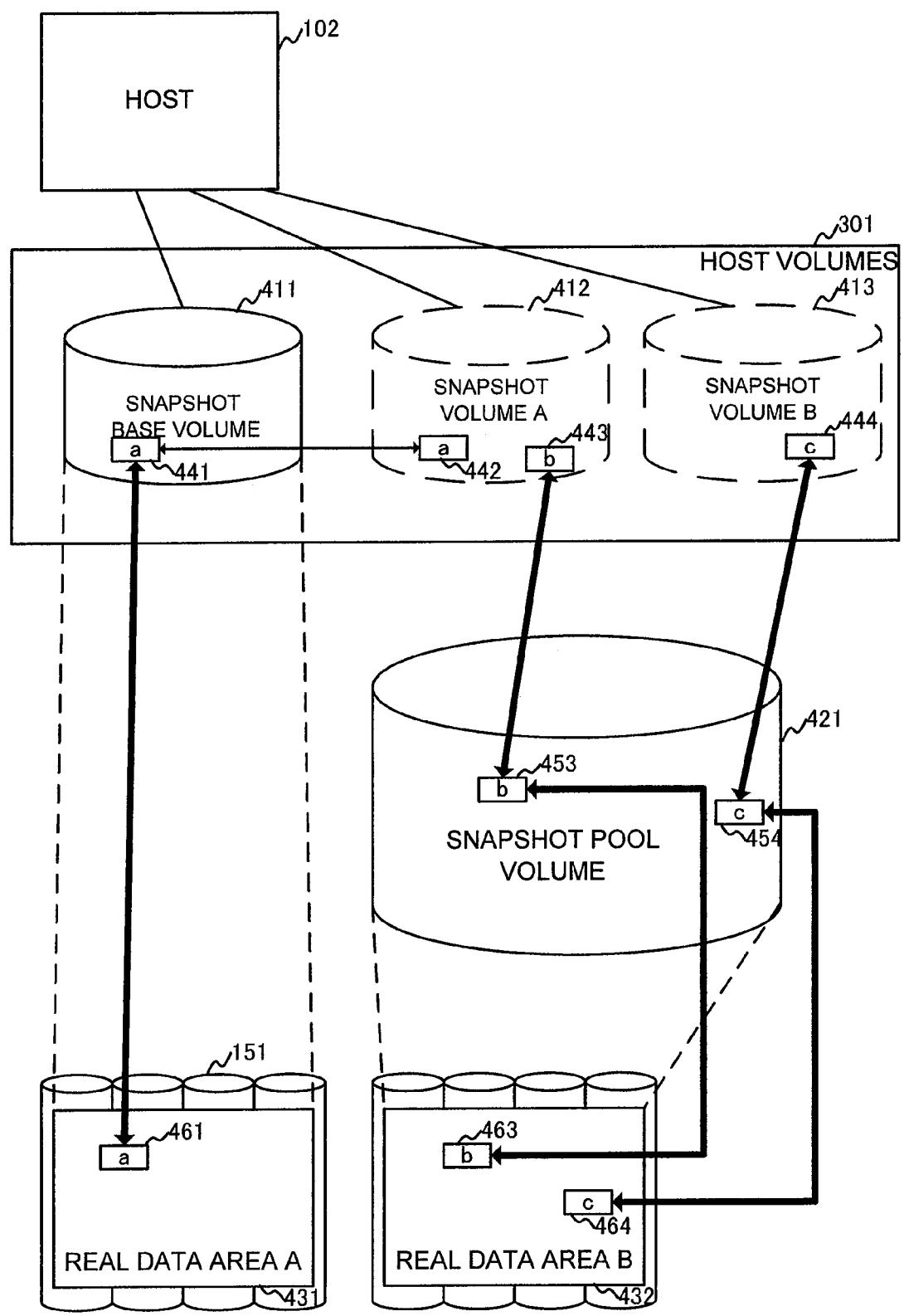
FIG. 4 is an explanatory diagram of a snapshot function implemented by a snapshot implementation program 212.

FIG. 4 is an explanatory diagram of the snapshot function implemented by the snapshot implementation program 212.

The snapshot function is a function for acquiring and holding an image, at a certain time point, of a logical volume supplied to the host 102 by the storage controller 101. However, according to the present embodiment, a snapshot function is, as described subsequently, a function for referring to the same area, for data that is shared between a snapshot image and a volume serving as a snapshot base, and that is shared between snapshots.

The storage controller 101 supplies a snapshot base volume 411, a snapshot volume A412, and a snapshot volume B413 to the host 102 as host volumes 301.

The snapshot base volume 411 may be a virtual volume, as shown in FIG. 3, but is a normal volume here. The snapshot base volume 411 is linked to a real data area 431 configured by disks 151, and an area a441 (a551 in FIG. 5) in the volume corresponds to an area a461 (a581 by way of a571 in the virtual pool volume 531 in FIG. 5) of the real data area.

The snapshot volume A412 holds a state, at a certain time point, of the snapshot base volume 411. A certain area a442 in the snapshot volume A412 points to the same data as the area a441 in the snapshot base volume 411. Hence, data corresponding to the area a442 in the snapshot volume A412 is stored in area a441 in the snapshot base volume 411, that is, in the area a461 in the real data area 431, and is shared with the snapshot base volume 411.

Data in the area b443 is an example of data in the snapshot volume A412 which differs from data in the snapshot base volume 411. The data in area b443 is data which is held only by the snapshot volume A412 and which differs from the data in the snapshot base volume 411. This corresponds to a case where after snapshot volume A412 acquisition an area corresponding to area b443 of the snapshot base volume 411 is updated or to a case where area b443 of the snapshot volume A412 is updated directly. Data in cases where a difference from the snapshot base volume is generated, such as the data in the area b443, is stored in the snap pool volume (snapshot pool volume) 421. The data in area b443 corresponds to data in an area b453 in the snap pool volume 421, and is actually stored in an area b463 in a real data area B432 configured by disks 151.

The snapshot volume B413 is also similar, with the data of an area c444 in which a difference has occurred corresponding to an area c454 in the snap pool volume 421, and the real data being stored in an area c464 in the real data area B432.

The data in area b443 and the data in area c444 are data in different snapshot volumes but can be stored in the same snap pool volume 421.

Furthermore, differential data increases due to write access to the snapshot base volume and the snapshot volumes after a snapshot is acquired, but the extent of the data increase (speed of the increase in differential data) is hard to predict in advance.

For differential data, data of different snapshot volumes can be stored as described earlier by dynamically assigning area in the form of a pool volume such as the snap pool volume 421, and the snapshot function can be operated smoothly without strictly predicting the tendency toward an increase in the differential data.

The description above relates to the snapshot function.

Figure 5:
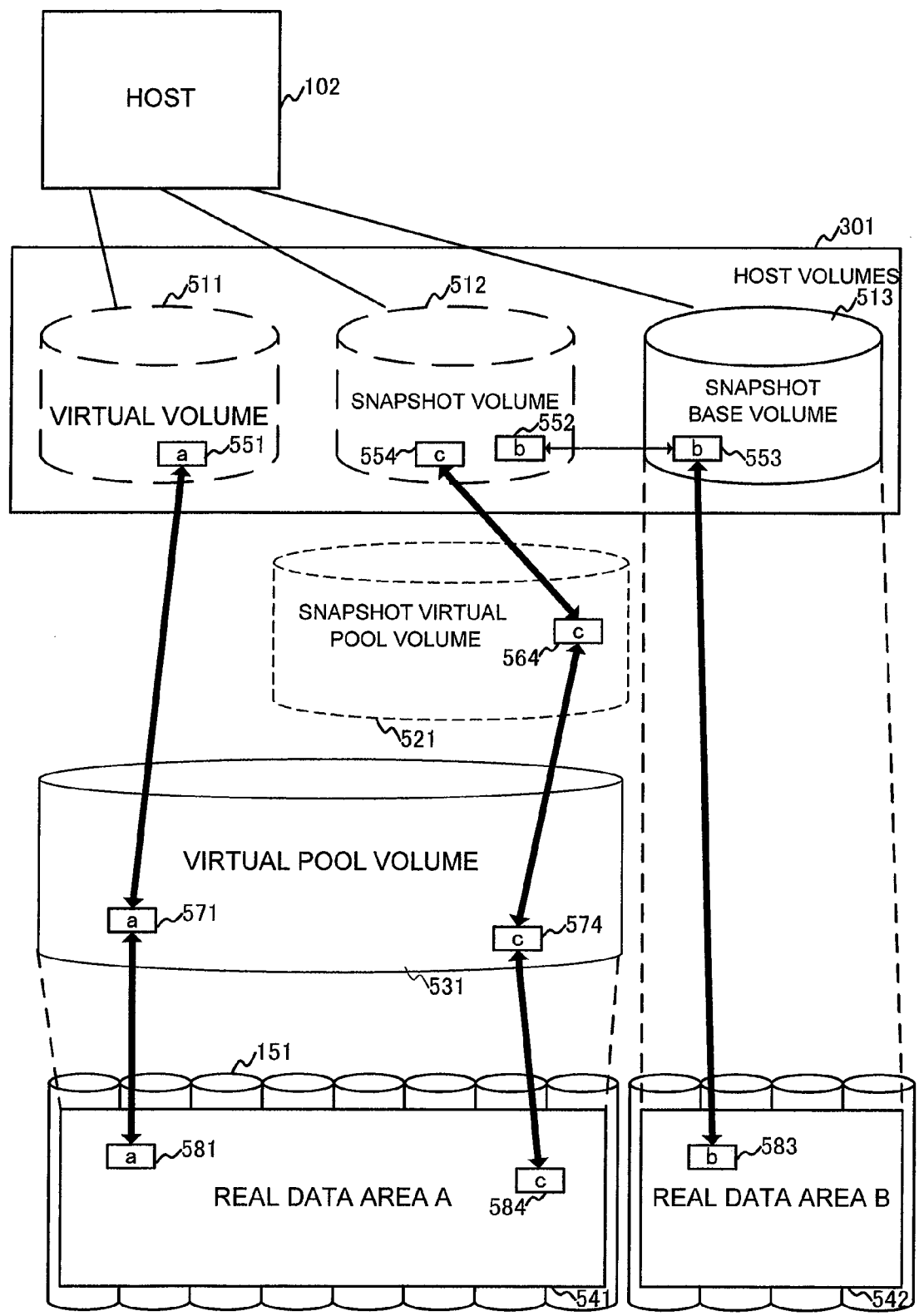
FIG. 5 illustrates a method in which a common pool volume is used by the virtual volume function and the snapshot function.

FIG. 5 illustrates a method in which a common pool volume is used by the virtual volume function and the snapshot function.

Host volumes 301 supplied to the host 102 include a virtual volume 511, a snapshot volume 512, and a snapshot base volume 513.

The virtual volume 511 uses a virtual pool volume (virtual volume function pool volume) 531, and stores real data in a real data area A541. The snapshot base volume 513 is a normal volume for storing real data in a real data area B542. Naturally, as mentioned earlier, the snapshot base volume 513 may be a virtual volume.

The snapshot volume 512 holds volume images of the snapshot base volume 513 at certain time points. An area b552 in the snapshot volume 512 indicates an area b553 in the snapshot base volume 513, and real data is stored in an area b583 in real data area B542. In other words, as per the case shown in FIG. 4, data common to the base volume indicates the same data.

An area c554 exists as an area in the snapshot volume 512 in which a difference from the base volume occurs. The data in the area c554 is stored in the snapshot pool volume, but in this embodiment, the pool volume is implemented by the virtual volume function and is a snapshot virtual pool volume 521. The snapshot virtual pool volume 521 uses the virtual pool volume 531 as the pool area. The snapshot area c554 corresponds to an area c564 in the snapshot virtual pool volume 521, and due to the virtual volume function, corresponds to an area c574 in the virtual pool volume 531, the final real data being stored in an area c584 in the real data area A541.

As a result of this system, the virtual pool volume and a pool volume for another function (snap pool volume in this embodiment) can be made the same volume. In other words, the pool used by the various functions using the pool can be a single pool. In a single pool for functions of a plurality of types, the capacity efficiency of the pool volume can be raised in comparison with a case where there is a plurality of pool volumes, similarly to a case where the plurality of virtual volumes use a single pool or a case where the plurality of snapshot volumes use a single pool. Furthermore, with this system, the capacity of the snapshot virtual pool volume 521 is unrelated to the capacity of the real data area A541 that the storage controller actually has, thereby obviating the need to design a capacity relating to the snapshot function pool area.

Moreover, in a case where the storage controller configures control rights for the logical volume and where processing relating to a certain logical volume is performed to render a certain core 121 responsible for the logical volume, control rights-related processing may be performed at the virtual volume function level. In other words, as long as a state is established where the virtual pool volume 531 may be used by a plurality of different cores, a common pool volume can be used irrespective of the state of the control rights of the volumes included in the host volume 301. A chunk system, described subsequently, exists as a system for performing control rights-related processing at the virtual volume function level.

FIG. 6 shows the composition of the control information 231.

Of the control information 231, FIG. 6 illustrates control information 231 that is required when a plurality of functions use the same pool. Furthermore, in the present embodiment, it is assumed that logical volumes are used as the pool area, and therefore the various information included in the control information is LU (Logical Unit) unit information. The control information 231 includes pool LU information 601 and pool usage LU information 602.

The pool LU information 601 stores a pool LU information table T601. The pool LU information table T601 stores information on the logical volumes used as the pool. More specifically, for example, the table T601 includes, for each logical volume (LU) used as the pool, information indicating a pool LUN (Logical Unit Number) ('PLU' in FIG. 6), an application, a type, a used pool LUN ('ULU' in FIG. 6), capacity, used capacity, and an overflow prevention start threshold value ('start threshold value' in FIG. 6) and overflow prevention end threshold value ('end threshold value' in FIG. 6).

The 'pool LUN' is the LUN (may be another type of identification information) of the logical volume used as the pool. The 'used pool LUN' is the number of the pool LU being used.

'Application' indicates what kind of function is using the pool LU.

'Type' indicates the implementation method for each pool LU, i.e., whether the pool is implemented by either a normal volume method or virtual volume method.

In the pool LU information table T601, the logical volume of the pool LUN 5 is a snapshot function normal volume pool, and therefore corresponds to the snap pool volume 421. The logical volumes of the pool LUNs 13 and 14 are the snapshot pool but correspond to the snapshot virtual pool volume 521 since their implementation method is the virtual volume method. Furthermore, the logical volume of the pool LUN 3 is the virtual volume pool and corresponds to the virtual volume function pool volume 531 since the pool is also used as a snapshot virtual volume pool.

In the pool LU information table T601, 'capacity' indicates the capacity of each pool area (pool LU). Here, the same capacity must actually be prepared for the pool LU, which is a normal type of volume, whereas capacity is not necessarily prepared for a virtual type of volume. For example, for pool LUN 3, the capacity is 30 TB, and a 30 TB disk is actually prepared. However, the pool LUNs 13 and 14, which use the pool LUN 3, are configurable to establish a total size of 40 TB, irrespective of their actual capacity of 30 TB.

The 'used capacity' indicates how much of the above described predetermined capacity has currently actually been assigned (that is, the total assigned area).

The 'overflow prevention start threshold value' and the 'overflow prevention end threshold value' are threshold values at which the overflow prevention processing starts and ends, and are threshold values for the ratio of the used capacity to the pool LU capacity. For example, in a case where the capacity is 100 TB, the overflow prevention start threshold value is 90%, and the overflow prevention end threshold value is 80%, overflow prevention processing is started when the used capacity reaches 90 TB. The used capacity is subsequently reduced or increased by overflow prevention processing, and when the used capacity reaches 80% or less (80 TB when there has been no increase in capacity), the overflow prevention processing ends.

The pool usage LU information 602 stores a pool usage LU information table T602. The pool usage LU information table T602 stores information on the LUs that are actually using each pool LU described in the pool LU information table T601. More specifically, for example, the table T602 includes, for each LU actually using each pool LU described in the pool LU information table T601, information indicating the LUN, the used pool LUN ('ULU' in the drawings), and the application and priority level.

The 'LUN' is the number of the LUs using the pool LU.

The 'used pool LUN' is the number of the pool LU being used.

The 'application' indicates for what function a target LU is using the pool.

The 'priority level' is a parameter for determining the processing content of the overflow prevention processing. Note that information such as the priority level need not be in the table T602 and, in this case, information corresponding to the priority level may be determined based on the application. For example, in overflow prevention processing (described subsequently), the LU of a first application may be recognized as having a higher priority level than the LU of a second application.

Figure 21:
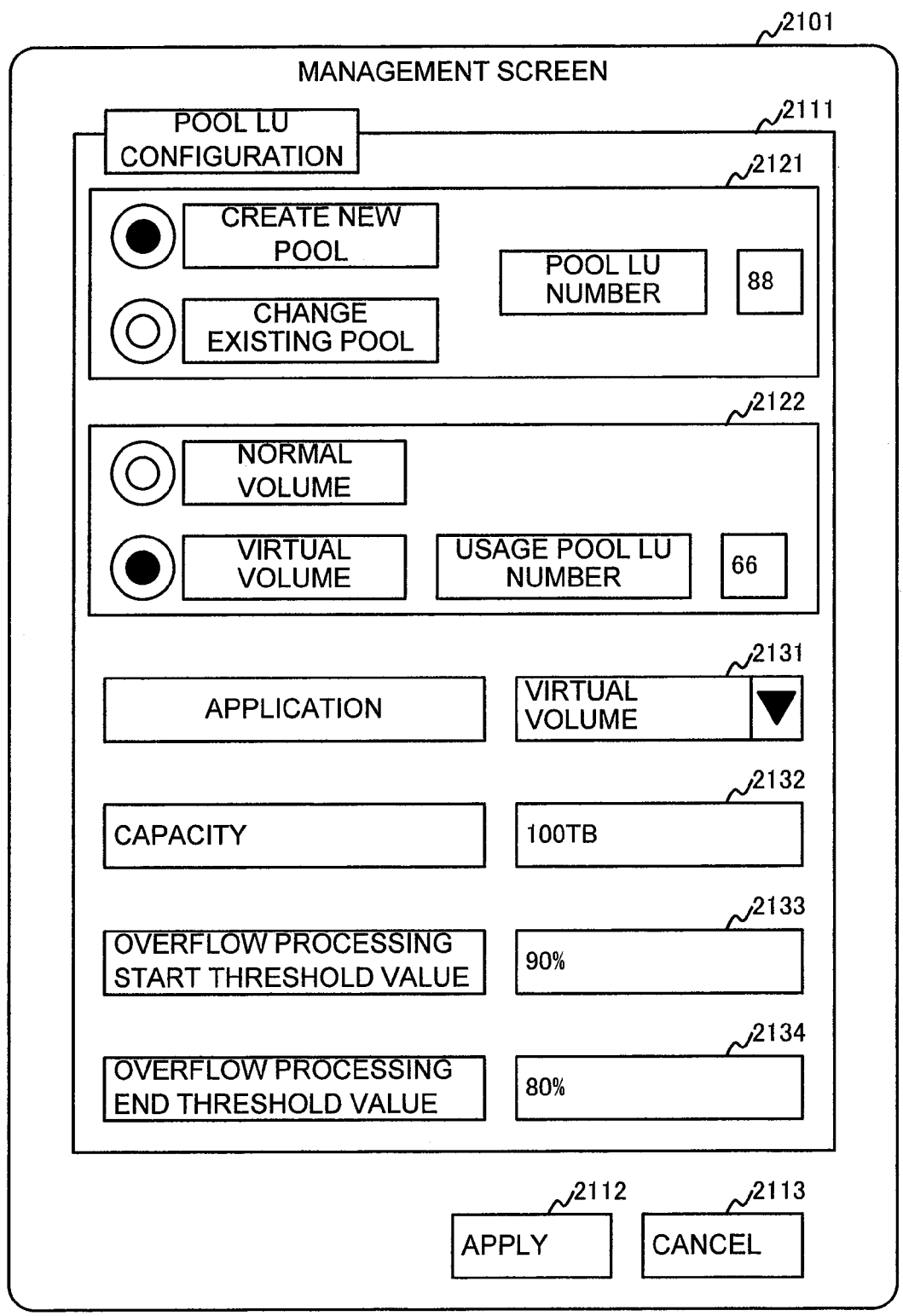
FIG. 21 shows a management screen 2101 for configuring a pool LU.

FIG. 21 shows a management screen 2101 for configuring a pool LU.

In all the embodiments of the present invention, the 'management screen' is a screen displayed by the management host 103. The management screen 2101 includes a pool LU configuration part 2111, an apply button 2112, and a cancel button 2113.

The pool LU configuration part 2111 includes a pool LU selection part 2121, select radio buttons for creating a new pool or modifying the configuration of an existing pool, and an input box for configuring a target pool LUN. For the selected pool LUN, it is possible to select, via a type configuration part 2122, whether a normal volume is to be used, a virtual volume is to be used, or, when a virtual volume is used, which pool LU is used.

In addition, the pool LU configuration part 2111 includes a part 2131 for selecting an application of the pool LU being configured, a part 2132 for inputting a capacity, a part 2133 for inputting an overflow (prevention) processing start threshold value, and a part 2134 for inputting an overflow (prevention) processing end threshold value.

The apply button 2112 is a button for applying the various information that is input, and the cancel button 2113 is a button for discarding the various information input.

The various information that is configured via the management screen is reflected in the pool LU information table T601.

Figure 22:
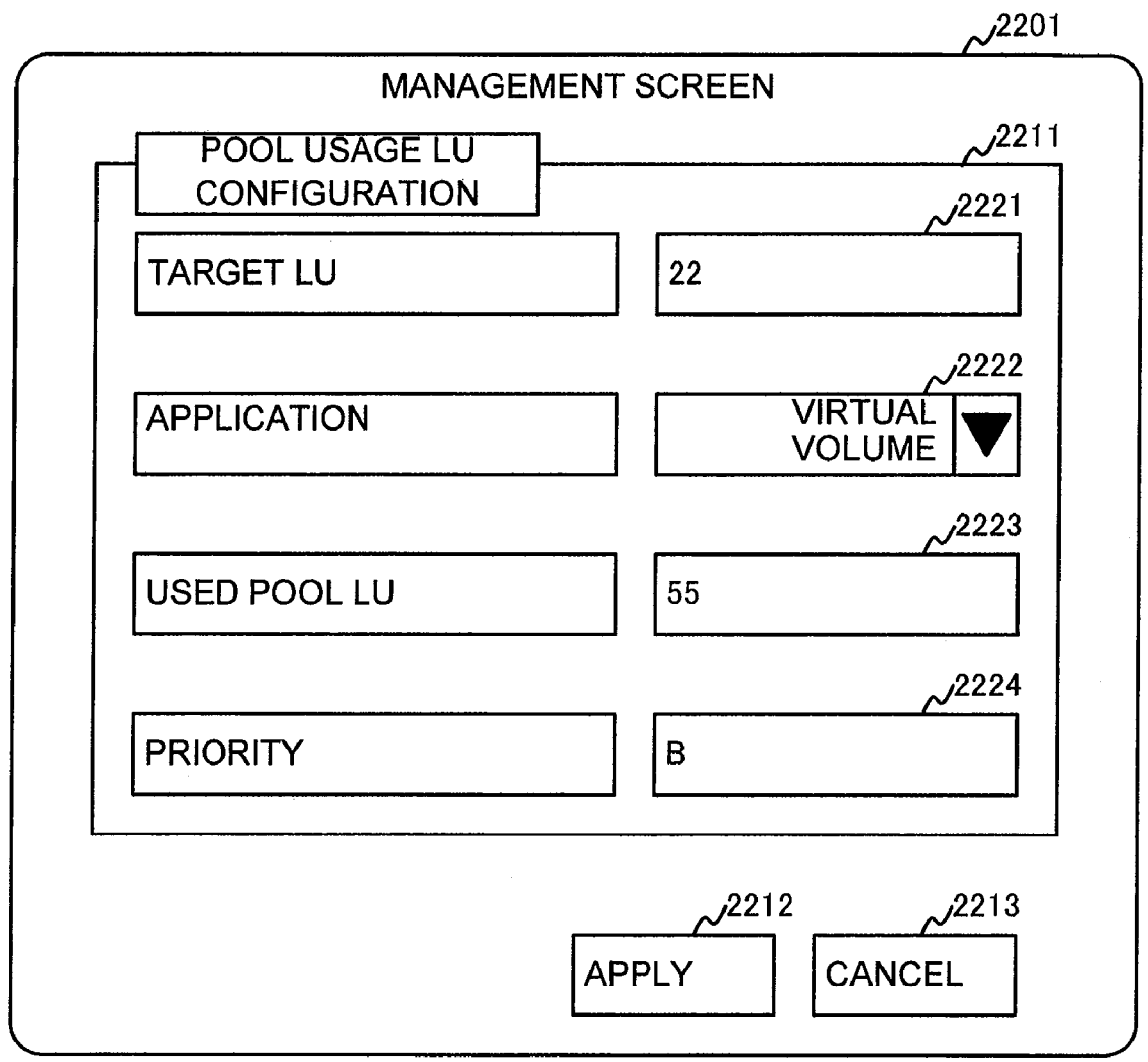
FIG. 22 shows a management screen 2201 used in configuring a pool usage LU.

FIG. 22 shows a management screen 2201 that is used to configure a pool usage LU.

The management screen 2201 comprises a pool usage LU configuration part 2211, an apply button 2212, and a cancel button 2213.

The pool usage LU configuration part includes a target LU selection part 2221, and a configuration target LU is selected via this screen. The pool usage LU configuration part also includes an application selection part 2222 for selecting an application to be run when the target LU uses the pool, a pool LU selection part 2223 for selecting a pool LU to be used by the target LU, and a priority level configuration part 2224 for configuring the priority level of the target LU.

The apply button 2212 is a button for applying the various information that is input, and the cancel button 2213 is a button for discarding the various information input.

The various information that is configured via this management screen is reflected in the pool usage LU information table T602.

Figure 7:
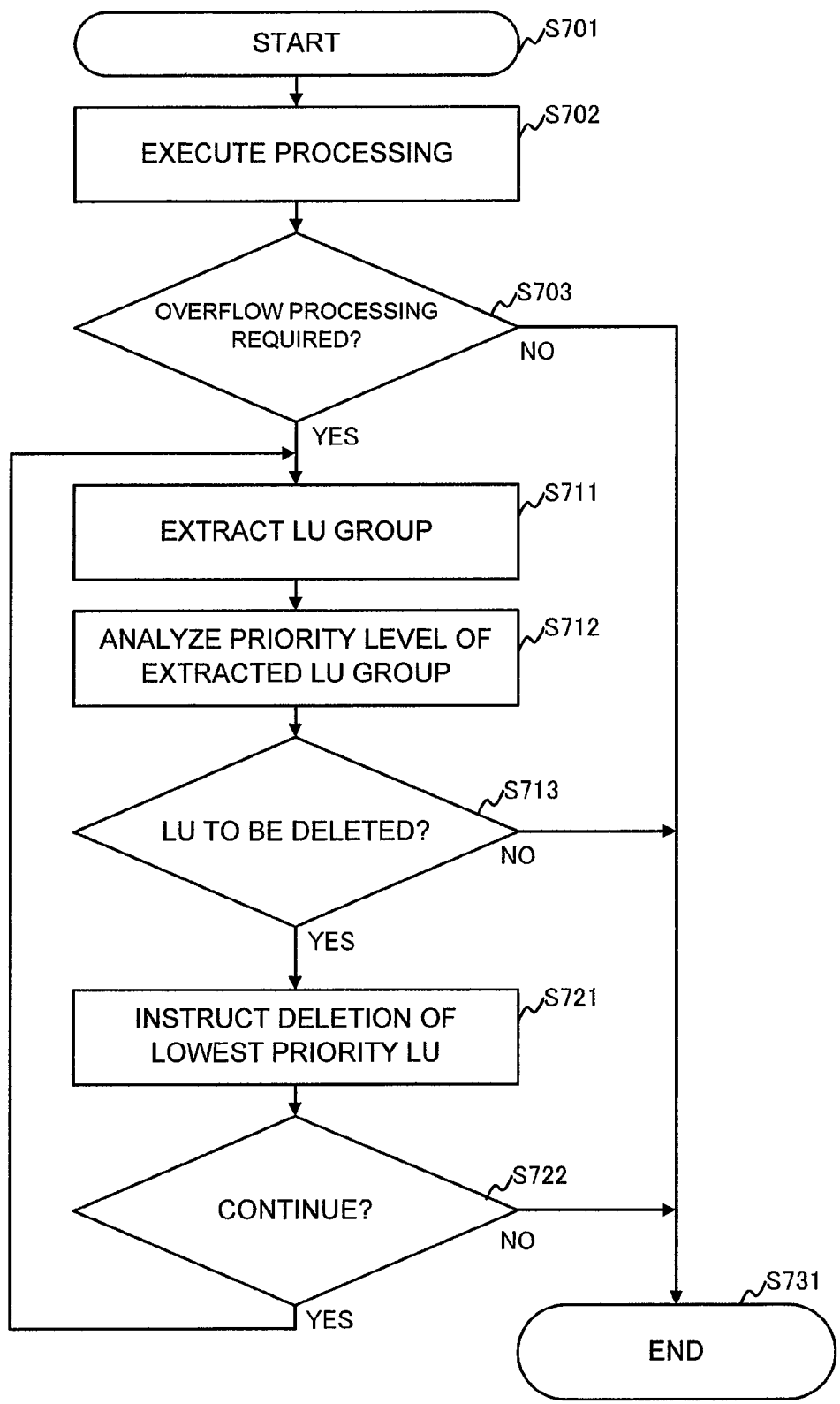
FIG. 7 shows a processing sequence performed when there is a risk of information stored in a pool area overflowing.

FIG. 7 shows a processing sequence performed when there is a risk of information stored in the pool area overflowing.

As described earlier, for the various functions using the pool area, a capacity greater than the actual capacity assigned to the pool area can be configured. While this has the effect of simplifying capacity design, this reflects the fact that a capacity greater than that actually assigned to the pool area may be required by the host, and so on. Hence, information to be stored in the pool area may exceed the actual capacity or there may be an increased likelihood of the capacity being exceeded (the usage rate of the pool area may increase).

The pool overflow prevention processing shown in FIG. 7 is processing that is executed in order to avoid overflow in the situation described above. In this embodiment, this involves processing to eliminate deletable data among the data in the pool. Alternatives to deletion processing include a method for lowering the capacity usage rate by assigning a new disk area from a free area in the storage controller or from another pool area with excess capacity, in order to increase the pool capacity itself, or processing to encourage the user to add capacity to the pool.

First, pool overflow-related processing is started (S701), and processing that may generate overflow prevention processing is executed (S702). The trigger for the generation of overflow prevention processing is when the usage rate of a certain pool exceeds the overflow prevention start threshold value corresponding to the pool. Accordingly, in S702, processing to assign a new area from a certain pool (processing in which the usage capacity of a certain pool increases), or processing in which a real data area assigned to a certain pool is removed (processing in which the pool capacity is reduced) is performed, for example.

Thereafter, the pool overflow monitoring program 222 judges whether overflow prevention processing is required in a pool serving as a processing target (S703). This means that even when there is an increase in the used capacity, for example, due to S702, if the usage rate drops below the overflow prevention start threshold value, there is no need to perform pool overflow prevention processing. Hence, the threshold value is checked in S703. When overflow prevention processing is unnecessary, pool overflow-related processing ends without performing the overflow prevention processing (S731).

When overflow prevention processing is required, the pool overflow monitoring program 222 extracts an LU group that is using the pool being processed (S711). Here, the pool LU information table T601 and the pool usage LU information table T602 are referred to. It is clear from the pool usage LU information table T602 that when the pool volume with the pool LUN 3 is likely to overflow, the LUNs 2 and 11 are targeted as LUs using the pool LUN 3. It can also be seen from the pool LU information table T601 that the pool LUNs 13 and 14 also use the pool LUN 3, and that LUNs 20, 35, and 52, which use the pool LUNs 13 and 14, are also in the LU group using the pool being processed in S711.

Thereafter, the pool overflow monitoring program 222 analyzes the priority level of each LU pertaining to the extracted LU group (S712). The priority level of each LU is obtained from the pool usage LU information table T602. Several possibilities may be considered for the priority level as referred to here and for the method of analyzing the priority level.

An example of the priority level and its analysis is provided below. LUs of priority levels A, B, and C must be undeletable. In a case where volumes using the virtual volume function are used in normal operation of a computer system, it is normally impossible to delete data since the system is run continuously, and it is therefore appropriate to configure LUs at these priority levels.

An example of the differences between priority levels A, B, and C will be shown below. With priority level A, when there is a deletable LU among the LUs using the same pool, the deletable LU is deleted. With priority level B, even when a deletable LU exists, the deletable LU is not deleted. Further, with priority level C, when the overflow prevention start threshold value is exceeded, new area assignment is not executed, and a request for new area assignment is allowed to fail.

In cases where the overflow prevention start threshold value is less than 100%, processing can be continued even when the usage rate of the pool area executing the processing cannot be lowered. However, when the pool usage rate is 100%, in cases where a processing request to assign a new area from the pool is subsequently issued to the LU using the pool, the request fails.

A priority level A volume is a volume with a policy whereby another deletable volume (LU) is actively deleted in order to avoid request failure due to complete overflow as far as possible. As a result, the free capacity in the pool used by the priority level A volume increases, that is, the area assignable to the priority level A volume increases.

A priority level B volume is a volume with a policy whereby an adverse effect on operations, such as that caused by allowing a processing request due to new assignment to fail when the priority level B volume itself is deleted or overflow prevention processing is being performed, is avoided, but whereby the priority level is not so high that another volume is deleted, i.e., complete overflow is granted to a certain degree.

A priority level C volume is a volume with a policy whereby deleting the volume itself is not allowed, and the effect on volumes of the priority levels A and B is minimized by allowing a new assignment to fail.

Naturally, even though the varied processing of the present embodiment is performed, complete pool overflow may still occur. The processing of this embodiment serves to thoroughly suppress pool overflow, and allows selection of the optimum pool volume usage method based on the volume priority level even when overflow occurs.

Volumes of priority level D and below are volumes that may be deleted by overflow prevention processing. For example, a snapshot volume, even when deleted, does not affect the normal operation of the computer system. Furthermore, in a case where a snapshot volume is acquired at a predetermined time point interval (every minute, for example), although there is a reduction in recoverable images when deletion is performed by leaving images at 10 minute intervals, the effect on the system operation is minimal. Furthermore, a virtual volume that stores an old log is deletable due to a phenomenon called 'log wrap'. Priority level D and below is information for judging which volumes among the deletable volumes should also be deleted, and naturally the lower the priority level when a volume is deleted, the lesser the adverse effect.

After receiving the results of the analysis of S712, the pool overflow monitoring program 222 judges whether an LU to be deleted is present in the extracted LU group (S713). Here, in a case where a deletable LU of priority level D or lower does not exist, or a priority level A LU does not exist, for example, there is no LU to be deleted, and hence, although a pool overflow prevention processing request may be issued, the result is that overflow prevention through deletion is not possible, and hence overflow-related processing ends (S731).

In a case where there is an LU to be deleted, the pool overflow monitoring program 222 instructs deletion of the lowest priority LU among the LUs to be deleted (S721). Upon receipt of the instruction of S721, deletion of data of the LU to be deleted is executed by the data deletion program 223, whereupon the used capacity of the pool being processed is reduced and the LU information being used is deleted, and the pool LU information table T601 and the pool usage LU information table T602 are updated.

Thereafter, the pool overflow monitoring program 222 continuously judges whether overflow prevention processing is required for the pool being processed (S722). This judgment is made using the capacity of the pool LU information table T601, the used capacity, and the overflow prevention end threshold value. By configuring the threshold values for starting and ending the overflow prevention processing such that the end threshold value is a degree lower, the overflow prevention processing enters a state of being continuously executable, and the processing efficiency can be improved, hence the sequence described above. In S722, in a case where the used capacity falls below the overflow prevention end threshold value, there is a pool overflow prevention processing request, and when a successful result is obtained, the pool overflow-related processing ends (S731). In a case where the overflow prevention end threshold value is exceeded, the processing returns to S711, whereupon overflow prevention processing is executed after once again extracting a processing target LU group.

In FIG. 7, each time there is processing yielding a change in the pool usage rate, a check of whether pool overflow prevention processing is required is performed in S703. With this system, although rapid processing is possible when there is a danger of pool overflow, there is the problem of a large overhead when performing this check.

Figure 8:
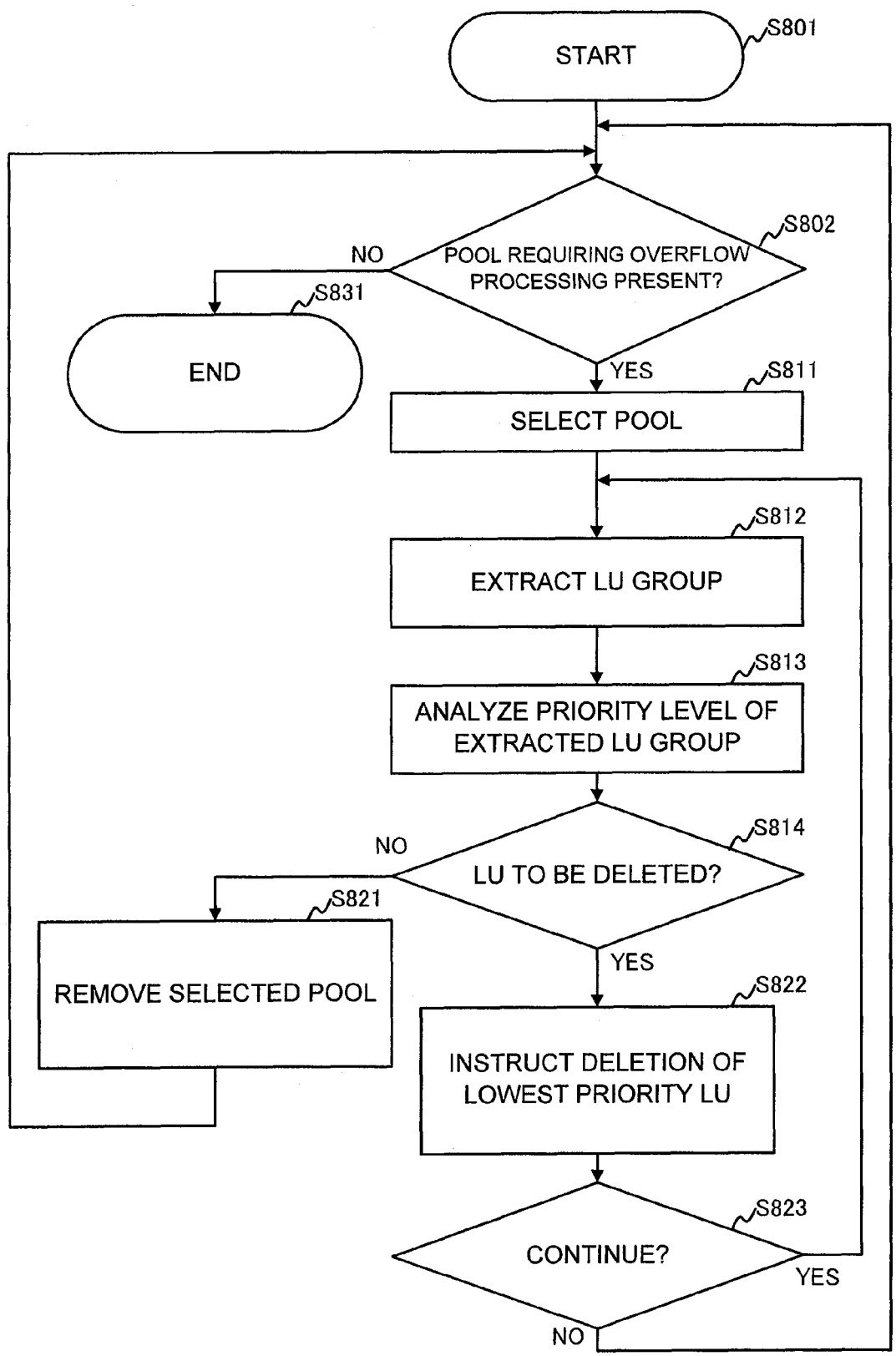
FIG. 8 shows a processing sequence for a case where it is checked, by polling, whether it is necessary to execute pool overflow prevention processing.

FIG. 8 shows a processing sequence for a case where it is checked, by polling, whether it is necessary to execute pool overflow prevention processing.

When pool overflow prevention processing is started (S801), the pool overflow monitoring program 222 first judges whether there is a pool requiring overflow prevention (S802). Here, in a case where a pool requiring overflow prevention is not present, the pool overflow prevention processing ends (S831).

In a case where a pool requiring overflow prevention is present, the pool overflow monitoring program 222 selects one of the pools requiring overflow prevention (S811).

Thereafter, the pool overflow monitoring program 222 extracts an LU group using the selected pool (S812), analyzes the priority level of the extracted LU group (S813), and judges whether an LU to be deleted is present in the extracted LU group (S814). This processing is the same as that of S711, S712, and S713.

In a case where an LU to be deleted is not present in S814, the pool overflow monitoring program 222 removes the selected pool from the overflow prevention requirement judgment (S821), and after making a setting to prevent this pool from being selected again, judges in S802 whether there is another pool requiring overflow prevention.

In a case where an LU to be deleted is present in S814, the pool overflow monitoring program 222 instructs deletion of the LU with the lowest priority level among the LUs to be deleted (S822), and continuously judges whether overflow prevention is required for the selected pool (S823). This processing is the same as that of S721 and S722. In a case where overflow prevention is required in S823, the processing returns to S812, and extraction of an LU group using the selected pool is performed once again. In a case where overflow prevention is unnecessary, an overflow prevention request is made to the selected pool, and, given a successful result, the processing ends. In S802, it is judged whether another pool requiring overflow prevention exists.

Figure 9:
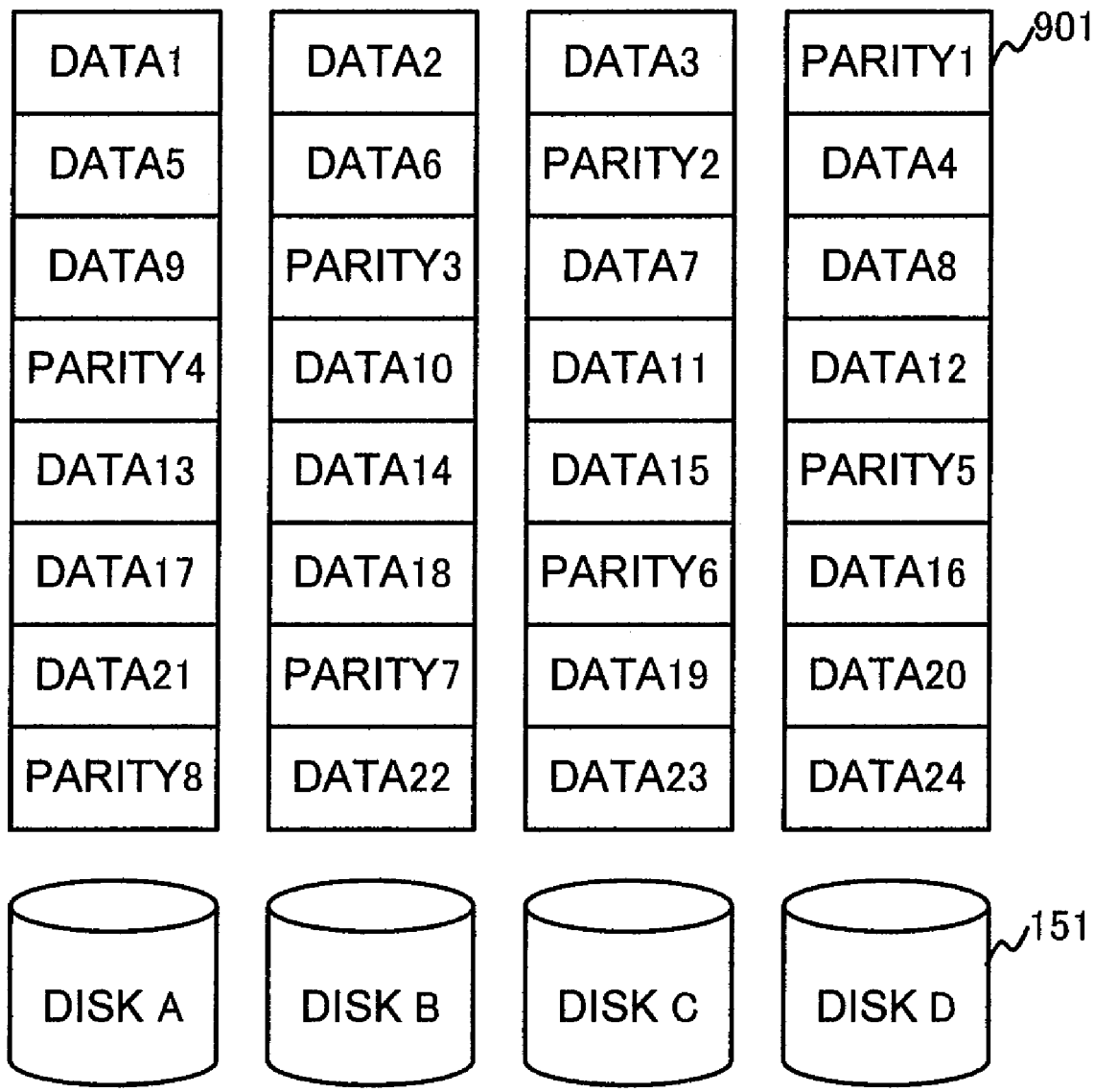
FIG. 9 shows an example of data allocation with respect to a group of disks 151.

FIG. 9 shows an example of data allocation with respect to a group of disks 151.

One square 901 of data 1 or the like is called a stripe, which is a unit area provided on a disk 151 and typically data of a continuous address. Data 1, data 5, data 9, and parity 4, and the like are stored on disk A, and data 2, data 6, parity 3, and data 10, and the like are stored on disk B.

FIG. 9 shows data allocation known as RAID5, and shows in particular data allocation called 3D+1P, in which one parity is created from three data. Data 1 to data 24 are data allocated in numerical order. Parity data is created and stored in order, with parity 1 being created from data 1, 2, and 3, and parity 2 being created from data 4, 5, and 6. A unit area of data I/O with respect to a RAID group, specifically an area storing a set of the data 1, 2, and 3 and parity 1, for example, is called a stripe column. Naturally, the storage controller supports RAID levels other than RAID5, and configurations with different numbers of data for one parity, and the present embodiment is not limited to the abovementioned configuration. Furthermore, the present embodiment is not limited to data allocation or the like even with the same 3D+1P of RAID5.

Figure 10:
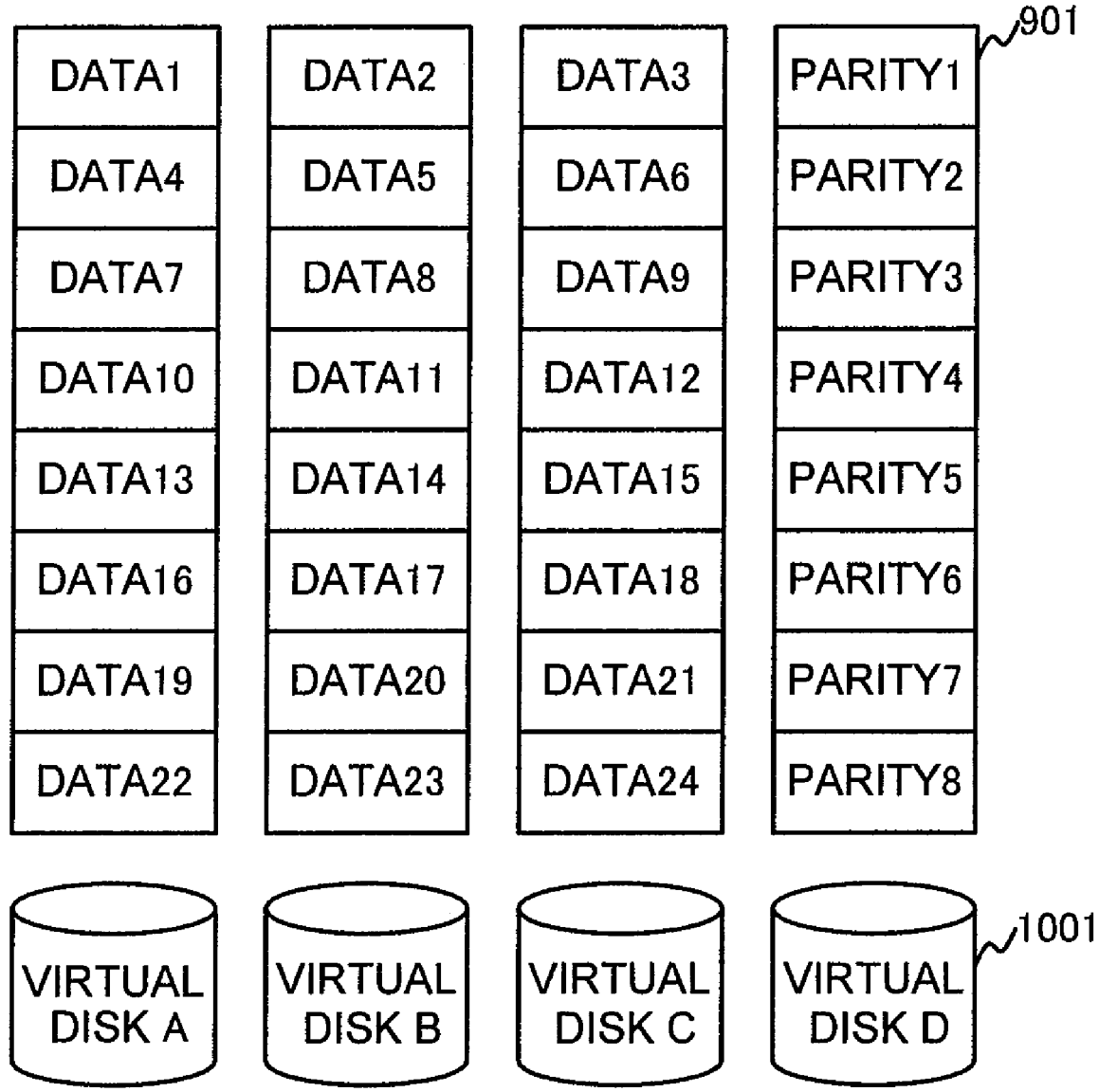
FIG. 10 shows another aspect of the data allocation shown in FIG. 9.

FIG. 10 shows another aspect of the data allocation shown in FIG. 9.

According to FIG. 10, the configuration-related relationship between the data and parities is retained, while only the storage points on the disk have been virtually rearranged. More specifically, data 1, 4, 7, 10, . . . are stored on the virtual disk A, and the data 2, 5, 8, and the like are stored on the virtual disk B. The data management method will be described subsequently using the virtual disks A to D 1001 shown in FIG. 10.

Figure 11:
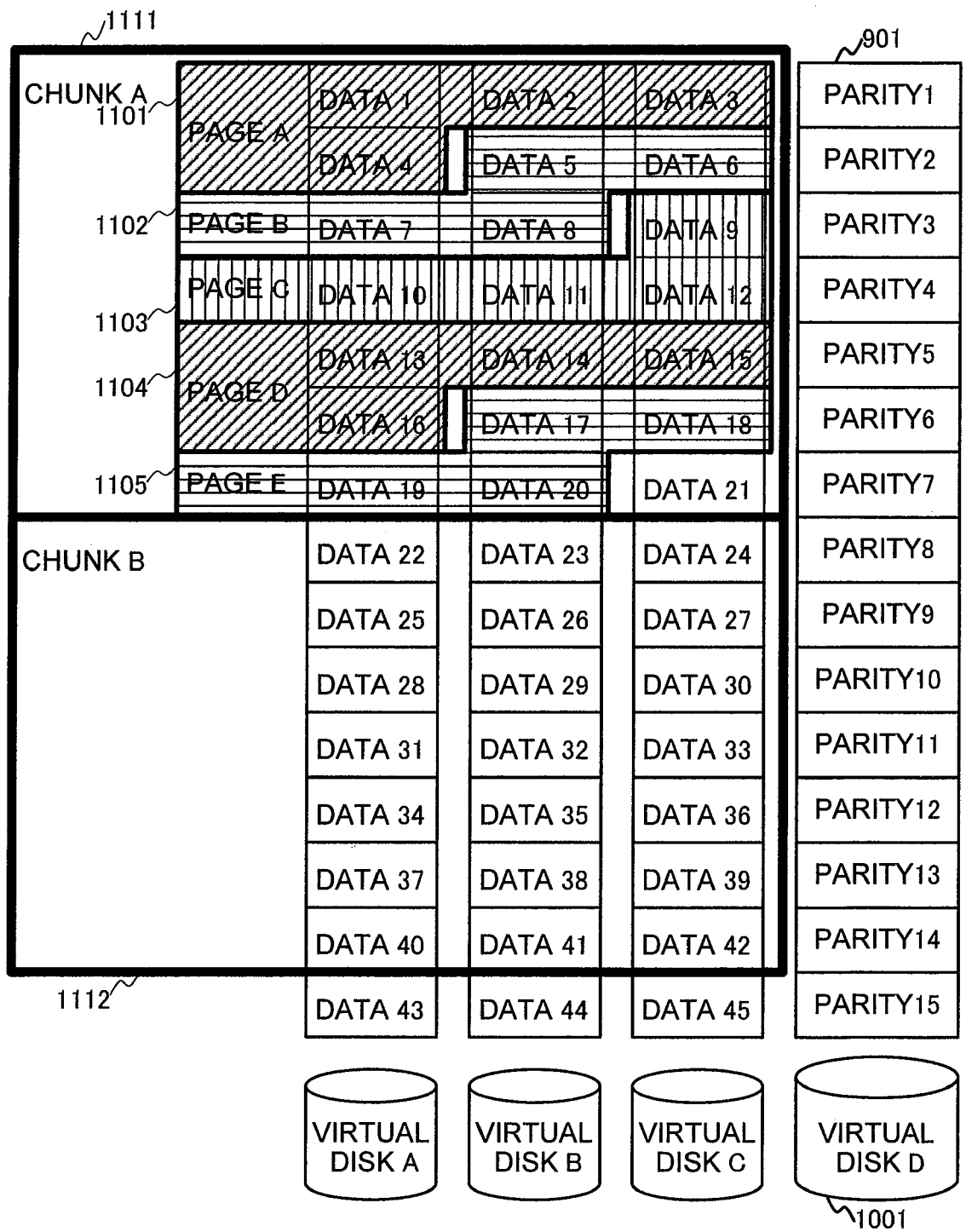
FIG. 11 illustrates the application of the data allocation according to this embodiment to the data allocation shown in FIG. 10.

FIG. 11 illustrates the application of data management according to the present embodiment to the data allocation shown in FIG. 10.

First, units with which functions using the pool secure an area for storing data in a pool area are called 'pages'. Here, the page size is, by way of example, equivalent to four stripes. The page size is of course optional, and may be variable depending on the function using the pool, and varied according to the situation even for the same function. In a case where the page size is equivalent to four stripes, and pages are assigned in order, data is assigned such that data 1, 2, 3, and 4 is assigned to a page A1101, and data 5, 6, 7, and 8 is assigned to a page B1102.

It is assumed here that a virtual volume function uses the pool, and that data of a plurality of virtual volumes is stored. FIG. 11 shows part of a real data area B332 of the virtual pool volume 321 used by the virtual volume A312 and the virtual volume B313. When area is assigned in page units to each virtual volume in this condition, a situation where the page A1101 is assigned to the virtual volume A312 and the page B1102 is assigned to the virtual volume B313 may arise. In addition, a case is assumed where the control rights of each virtual volume are assigned to different cores, or where the control rights are assigned to the same core during area assignment but the control rights of each virtual volume are assigned to different cores by control rights migration processing.

In this case, the managing core of the virtual volume A312 to which page A1101 has been assigned may process parity 1, which is calculated from data 1, 2, and 3. However, in cases where any of data 4, 5, or 6 is changed, an update of parity 2, calculated from the data 4, 5, and 6 is generated. In other words, two cores may update parity 2, namely, a core for managing the virtual volume A312 to which the page A1101, with which data 4 is assigned, belongs, and a core that manages the virtual volume B313 to which page B1102, to which data 5 and 6 are assigned, belongs.

In order to perform consistent parity update processing, when performing an update on data 4, 5, and 6, and parity 2, exclusion processing must be carried out to prevent cores other than the managing core from accessing the same area. This illustrates the fact that inter-core exclusion processing, which is reduced by configuring control rights, must be executed, which leads to complex and inefficient processing.

Here, in the present embodiment, the concept known as 'chunk' will be introduced. A 'chunk' is a unit which is configured by a plurality of pages, and for which it is ensured that a chunk boundary corresponds to a stripe column boundary. Although chunk size is optional, a chunk is divided into 21 stripes here, with a chunk A1111 including data 1 to 21, which correspond to pages A to E (1101 to 1105). The data 21 is a free area. Furthermore, a certain chunk is able to store only the data of a single virtual volume, with only the virtual volume A312 assigned to the chunk A1111, and the virtual volume B313 assigned to the chunk B1112. In this case, parities 1 to 7 of the parity area corresponding to the chunk A1111 are accessed only by the core with control rights for the virtual volume A312. Likewise, the parities 8 to 14 corresponding to the chunk B1112 are accessed only by the core with control rights for the virtual volume B313. As a result, inter-core exclusion processing is unnecessary for access to these areas, and a core with control rights is able to perform processing while ignoring the operations of the other core, thereby enabling a high-speed operation suited to the introduction of control rights.

Note that the effect described above is also obtained using a system in which page boundaries are stripe column boundaries but that, in comparison with the chunk system, there are a lot of wasted data areas. Furthermore, the units to be considered by the functions, which use pool areas known as pages, also have an effect on the control rights management units, and the processing of each is then complicated.

According to the chunk system, in a case where a plurality of virtual volumes are mixed in a single pool, access by a plurality of cores with control rights for the virtual volumes can be implemented simply and at high speed. This also applies to a case where the virtual volume 511 and the snapshot virtual pool volume 521 use the same virtual volume function pool volume 531, as shown in FIG. 5.

Accordingly, in a storage controller which includes a plurality of cores, and in which cores with volume control rights operate, when a function using a plurality of pools accesses a single pool, simple processing, which obviates the need to consider page sizes for each function or control rights for pages and redundant data used by each function, can be performed at high speed without exclusion processing for the other cores.

Example 2

Example 2 of the present invention will now be described. Here, the differences from Example 1 will mainly be described, with points in common with Example 1 being omitted from the description or described simply.

Figure 12:
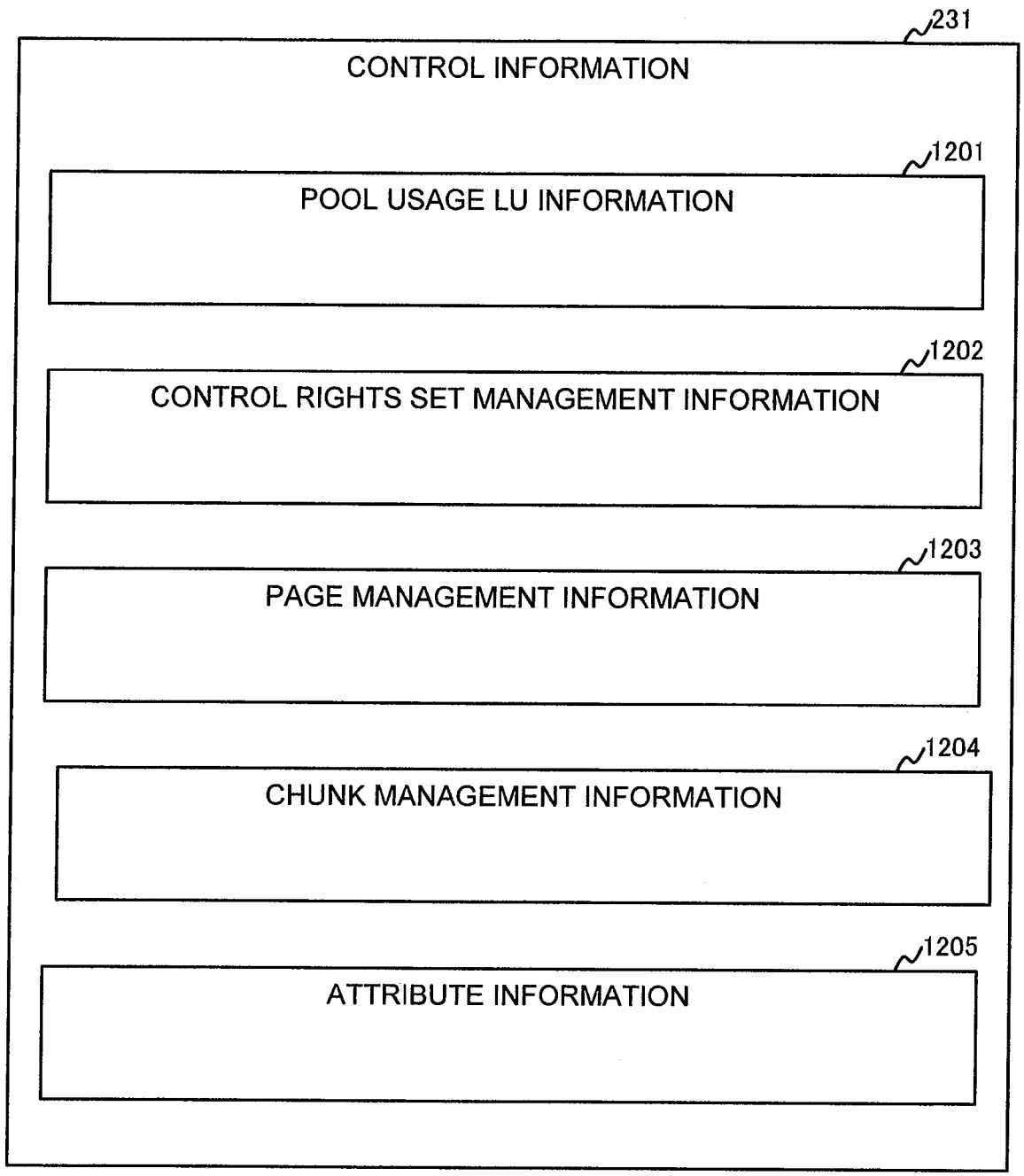
FIG. 12 shows part of the control information 231 according to Example 2.

FIG. 12 shows part of the control information 231 according to Example 2.

The control information 231 according to Example 2 includes pool usage LU information 1201 for storing settings and so forth relating to LUs using a pool area, control rights set management information 1202 which stores information relating to control rights sets, described subsequently, page management information 1203 which stores a state of each page, chunk management information 1204 which stores chunk-related information, and attribute information 1205 which stores page attribute-related information.

FIG. 13 shows the composition of pool usage LU information 1201.

The pool usage LU information 1201 includes a pool usage LU information table T1301. The pool usage LU information table T1301 includes, for each LU using the pool, information indicating an LUN, an LU range, a control rights set number, an application, and a page assign policy.

A 'control rights set number' is a number for internally assigned management within the storage controller 101 and for identifying a control rights set. A 'control rights set' is a set of logical storage areas (LUs or another type of logical storage areas) with the same control rights. Logical storage area sets with the same control rights set numbers (sets of one or more LU and/or one or more logical storage areas of another type) basically have the same control rights. Hence, logical storage area groups with the same control rights set number are able to share chunks and, when control rights are migrated, all the logical storage area groups with the same control rights set number are migrated at the same time, for example. For example, volume groups in which a snapshot base volume, the snapshot volumes thereof, and a host must be used as a set, and so on, are candidates for LU sets with the same control rights set number. Exceptions and the processing content will be described subsequently. Furthermore, there may also be a plurality of control rights set numbers for the same LU (see LUN 3 in the pool usage LU information table T1301). For this type of LU, a plurality of cores may manage the same LU. For example, in a case where only one LU exists in the storage controller 101, when the capacity of all the CPU cores in the storage controller 101 can be utilized, settings for such an arrangement can be made, and the LU can be divided into areas of a certain size, and the processing can be shared by the plurality of cores, while inter-core exclusion processing can be eliminated.

'Application' indicates the kind of function adopted by each LU (or partial area of the LU) when using the pool area.

'Page assign policy' indicates what kind of page is to be assigned to each LU (or partial LU area). For example, processing is performed to prioritize assignment of a high-speed page to an LU for which high-speed access is expected (see LUN 0 in the pool usage LU information table T1301) rapidly and by configuring the LU so that the LU is locked in a high-speed state.

FIG. 14 shows the composition of the control rights set management information 1202.

The control rights set management information 1202 includes a control rights set management information table T1401. The control rights set management information table T1401 includes, for each control rights set, a control rights set number, a managing CPU core number, belonging LUNs, and assigned chunk numbers.

The 'managing CPU core number' is the number of the CPU core that processes a control rights set number uniquely determined from the control rights set number. Here, the 'CPU core number' is a number serving to identify each of the plurality of cores 121.

The 'belonging LUNs' shows a list of LUNs belonging to the control rights set numbers. This is information easily derived from the pool usage LU information table T1301, but for the sake of simplifying the processing, the control rights set management information table T1401 also includes the information. Note that, in this embodiment, the LU with LUN 3 is divided into a plurality of areas, and different control rights set numbers are assigned to each area obtained. Hence, the same belonging LUN 3 belongs to a plurality of control rights set numbers (1 and 3) in the control rights set management information table T1401.

The 'assigned chunk numbers' are the numbers of the chunks currently being used for the control rights set numbers. 'Chunk numbers' are numbers for identifying chunks.

FIG. 15 shows the composition of the page management information 1203.

The page management information 1203 includes a page management information table T1501. The page management information table T1501 includes, for each page, information indicating a page number, an application, a page size, page usage LUNs, a chunk number, and an attribute.

A 'page number' is a number for identifying a page.

An 'application' indicates by which function the page number is being used.

A 'page size' is the size (storage capacity) of a page. By making the page size configurable for each page, pages of different page sizes can be mixed within the same chunk. According to the table T1501, pages of page sizes 4 kB, 64 kB, and 256 kB are mixed in a chunk with a chunk number 0. Furthermore, since different page sizes can be handled even in a case where the requested page size differs for each function, pages used by a plurality of functions can also be mixed in the same chunk. According to table T1501, snapshot pages and virtual volume pages are mixed in the chunk with chunk number 0.

'Page usage LUNs' are the LUNs of LUs using the pages. The same data in a snapshot volume and a base volume in a snapshot function exist in the base volume. A large number of functions using the pool may share data of the same content despite having different addresses in the host logical volume. Hence, a plurality of page LUNs may be assigned to a single page number (the page with page number 0 is used by LUs 1 and 2).

A 'chunk number' is a number identifying a chunk to which a page belongs.

An 'attribute' is information indicating an attribute of a page, for example, and is information indicating page performance, costs, and reliability, for example. Details will be provided subsequently.

FIG. 16 shows the composition of the chunk management information 1204.

The chunk management information 1204 is information for managing which states chunks are in. Chunk management information 1204 includes a chunk management information table T1601. The chunk management information table T1601 includes, for each chunk, information indicating a chunk number, an RG number, an attribute, and a free area status.

A 'chunk number' is a number for identifying a chunk.

An 'RG number' is an identification number of an RG (RAID Group) to which a chunk belongs. It is possible to refer to the RG number to determine the physical configuration of an area in which the chunk is actually stored. According to the table T1601, a plurality of RG numbers are associated with chunk number 15. This means that the chunk of chunk number 15 is configured by two different RGs. As described earlier, since the chunk boundary preferably coincides with the boundary of the stripe column, such a configuration is possible.

An 'attribute' is an attribute of an area determined by the chunk number and RG number, and will be described in detail subsequently.

A 'free area status' indicates how the pages in each chunk are assigned, and to what extent they are free. For example, it can be seen that the chunk of chunk number 3 has two free areas (e.g. free space) of 4 kB and 96 kB. Thus, the reason why a free area is not denoted by the total free area size in the chunk but instead by a plurality of numerical values is that each time a page is secured and released in a chunk, a free area becomes an outlier (a plurality of free areas are distributed within one chunk). In other words, in the example of chunk number 3, there are free areas of 4 kB and 96 kB, but these areas are not contiguous; for example, when a 10 kB page is assigned in this state, the page is divided, and measures for page formation with extended address permissions must be taken.

FIG. 17 shows the composition of attribute information 1205.

The attribute information 1205 includes an attribute definition table T1701 and a page attribute information table T1702.

The attribute definition table T1701 is information defining the content of identifiers used as the attributes shown in the page management information table T1501 and the chunk management information table T1601. The table T1701 includes, for each attribute, information indicating an attribute identifier, (A to D in the attribute definition table T1701), a summary, and features.

The 'summary' is a summary of the data storage area, basically of the RG (for example, the interface type of the disks forming the data storage area (SAS, for example), the RAID level (RAID5, for example), and the disk configuration (4D+1P)). In addition to the RG summary, functions of the storage controller 101 include, for example, a function (externally coupled function) for handling real data areas of another storage controller 101, and by describing such information when this function is used (attribute D), assignment based on a more detailed policy is possible during page assign logic (described subsequently).

A 'feature' is a feature such as performance, cost, or reliability.

The page attribute information table T1702 includes, for each page, information indicating a page number, a current state attribute, a page state, and a policy. Note that this information may be integrated in the page management information table T1501, which manages information for each page, but that, in this embodiment, information for determining an attribute-related processing policy is collected and managed by another table T1702.

'Page number' is a page identification number.

'Current state attribute' is a current attribute of a page.

The 'page state and policy' is a page usage frequency and a policy for subsequent page attribute changes. The page usage frequency mainly indicates the frequency with which access by the host 102 to a page occurs. The attribute change policy is a policy for changing the current attribute of a page to another attribute. For example, the current attribute of a page is changed in cases where the access frequency to the page corresponds to the attribute change policy. More specifically, for example, the CPU core which has control rights for the chunk including a certain high-performance page is able to monitor the frequency of access to the page and, when it is detected that the page has only been accessed infrequently, is able to recommend a change to a low-performance, low-cost page to the administrator. Furthermore, for example, a CPU core which has control rights for a chunk that includes a certain low-performance page is able to monitor the frequency of access to the page, and when it is detected that the low-performance page has been subject to high-frequency access, is able to recommend a change to a high-performance page to the administrator.

Figure 18:
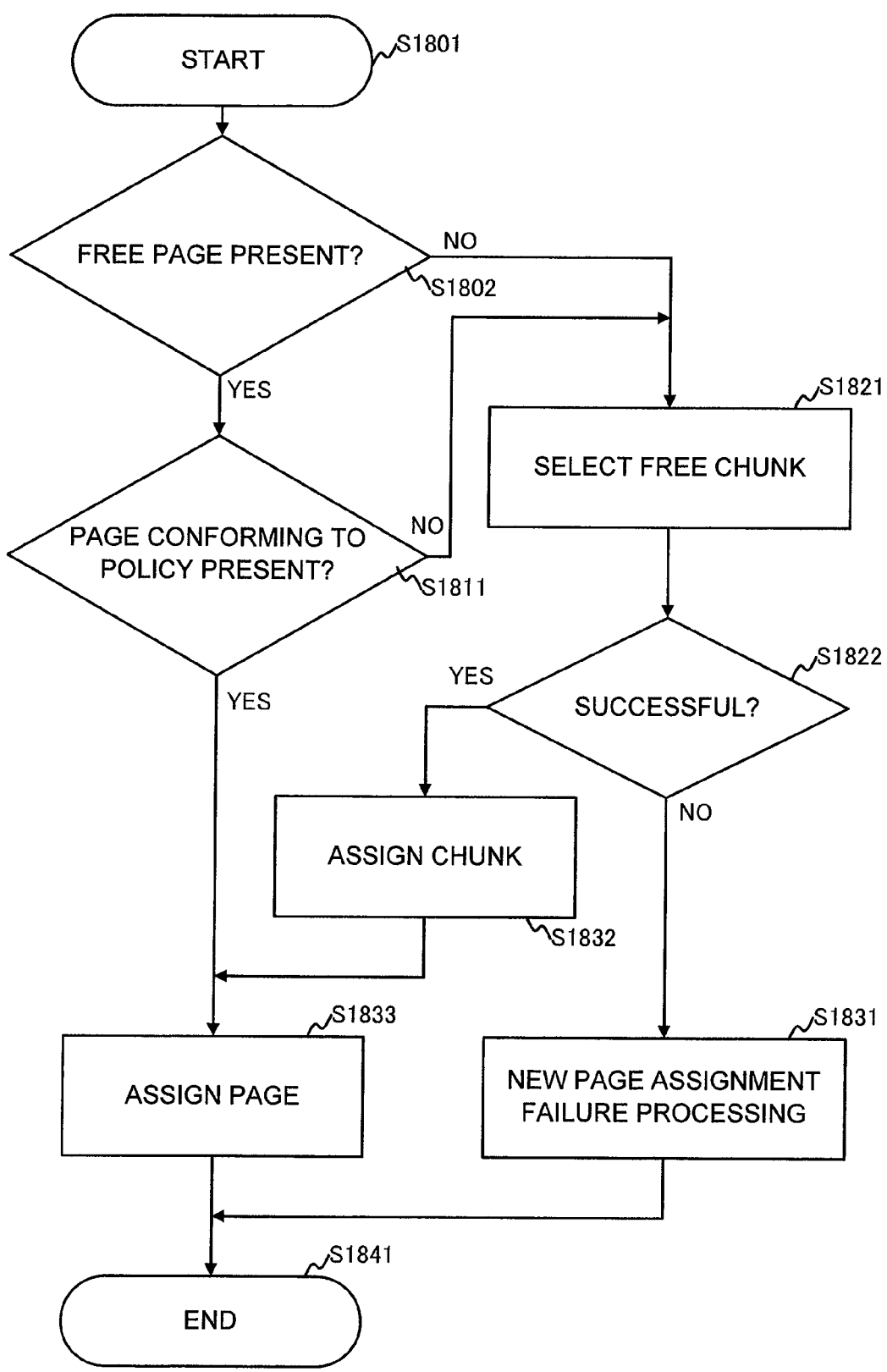
FIG. 18 shows a processing sequence when new page assignment is performed.

FIG. 18 shows a processing sequence when new page assignment is performed.

For example, new page assignment processing is started for a virtual volume undergoing a write process for the first time following creation (S1801). Here, the virtual volume is a processing target LU. Furthermore, the new page assignment processing is carried out by a CPU core, among the plurality of CPU cores, which has control rights for the processing target LU. This CPU core will be called the 'target managing core' in the subsequent description of FIG. 18.

First, the target managing core judges whether there is a free page in an assigned chunk of the same control rights set that the processing target LU belongs to (S1802). In S1802, the target managing core finds a control rights set number relating to the processing target LU and the corresponding range from the pool usage LU information table T1301. The target managing core then extracts a chunk number assigned to the control rights set number using the control rights set management information table T1401. The target managing core judges, for the extracted chunk, whether a free page exists by determining the status of the free area from the chunk management information table T1601.

In a case where a free area exists, the target managing core judges whether, among the free page groups, there is a page conforming to the page assign policy described in the pool usage LU information table T1301 (S1811). In cases where there is a page conforming to the policy, the target managing core assigns the page to the processing target LU by using the page assign/release program 225 (S1833), and the new page assignment processing ends (S1841).

In a case where there is no free page in the assigned chunk in S1802 and where there is no page conforming to the page assign policy in S1811, the target managing core retrieves and selects a chunk with a page conforming to the page assign policy of the processing target LU from the chunk management information table T1601 (S1821). The target managing core then judges whether or not the processing of S1821 has been successful, that is, whether the selection of a free chunk has succeeded (S1822).

In a case where a free chunk selection fails, the target managing core executes new page assignment failure processing (S1831). As processing content of S1831, methods include a method in which processing simply ends in a state where a page is lacking, or a method in which page assignment processing is executed once again by relaxing the page assign policy, but in either case the new page assignment processing ultimately ends (S1841).

In a case where free chunk selection succeeds, the target managing core uses the chunk assign/release program 226 to assign the selected chunk to the control rights set to which the processing target LU belongs (S1832). The chunk assigned in S1832 ought to have a page conforming to the page assign policy of the processing target LU. For this reason, the target managing core assigns a page by using the page assign/release program 225 (S1833), and ends the new page assignment processing (S1841).

Figure 19:
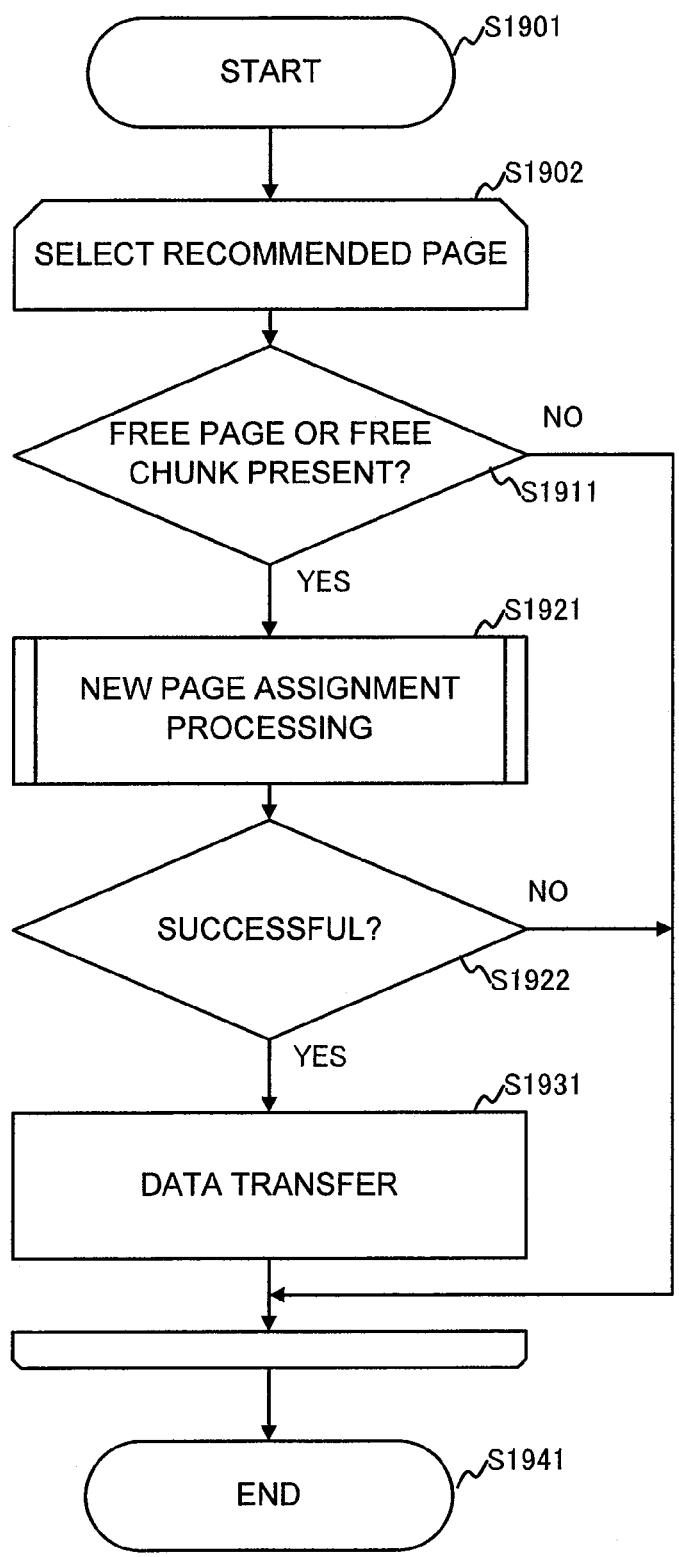
FIG. 19 shows a sequence for page attribute modification processing.

FIG. 19 shows a sequence of page attribute change processing.

When attribute change processing is started (S1901), an unprocessed attribute change recommendation page is selected by a certain CPU core, and the processing is subsequently repeated until there are no longer any unprocessed attribute change recommendation pages (S1902).

In S1902, the certain CPU core specifies which page an attribute change is recommended for by using the page attribute information table T1702. The pages for which an attribute change is recommended are generated for the following reasons: access to the page differs from the initially planned access, there is a change in the page assign policy from the administrator, or a change is applied to the configuration of the storage controller (for example, in cases where a new very high-performance storage device is added or the like, a high-performance recommendation page should be migrated to the new high-performance storage device).

The processing of the attribute change recommendation page selected in S1902 is performed by the CPU core with control rights for the chunk including the page. The CPU core is called the 'target managing core' in the description of FIG. 19.

The target managing core first judges, for the attribute change recommendation page selected in S1902, whether or not there is a free page or a free chunk with the attribute recommended in the page attribute information table T1702, by using the chunk management information table T1601 (S1911). At this time, processing to assign a new page in an assigned chunk involves less processing and provides superior performance than assigning a new chunk, and moreover securing a chunk even though there is a free page causes capacity to be wasted. Hence, searching for a secured chunk as a priority is efficient. In a case where there is no corresponding free page or free chunk in S1911, changing the recommended attribute for the selected page is determined to be impossible. Processing then moves to the end of the loop, and another unprocessed attribute change recommendation page is selected.

In a case where there is a corresponding page in S1911, the target managing core executes new page assignment processing (S1921). The processing of S1921 is the same as the processing indicated in S1801 to S1841 of FIG. 18. When S1921 ends, the target managing core judges whether or not new page assignment processing has succeeded (S1922). When this processing has failed, the target managing core ends the selected page processing. Processing then moves to the end of the loop, and the next attribute change recommendation page is selected.

In a case where new page assignment processing has succeeded, the target managing core executes processing to migrate data to the new assignment page by using the data copy/migration program 224 (S1931). Furthermore, since the processing executed in S1931 is page migration, the target managing core uses the page assign/release program 225 to place the originally used page in a free state (performs page release), and performs an update of the chunk free status, and an update of the page attribute information, and so forth. Furthermore, in a case where a chunk is empty due to the page release executed in S1931, the target managing core also uses the chunk assign/release program 226 to release the chunk from the control rights set. When S1931 is complete, the next unprocessed attribute change recommendation page is selected.

Figure 20:
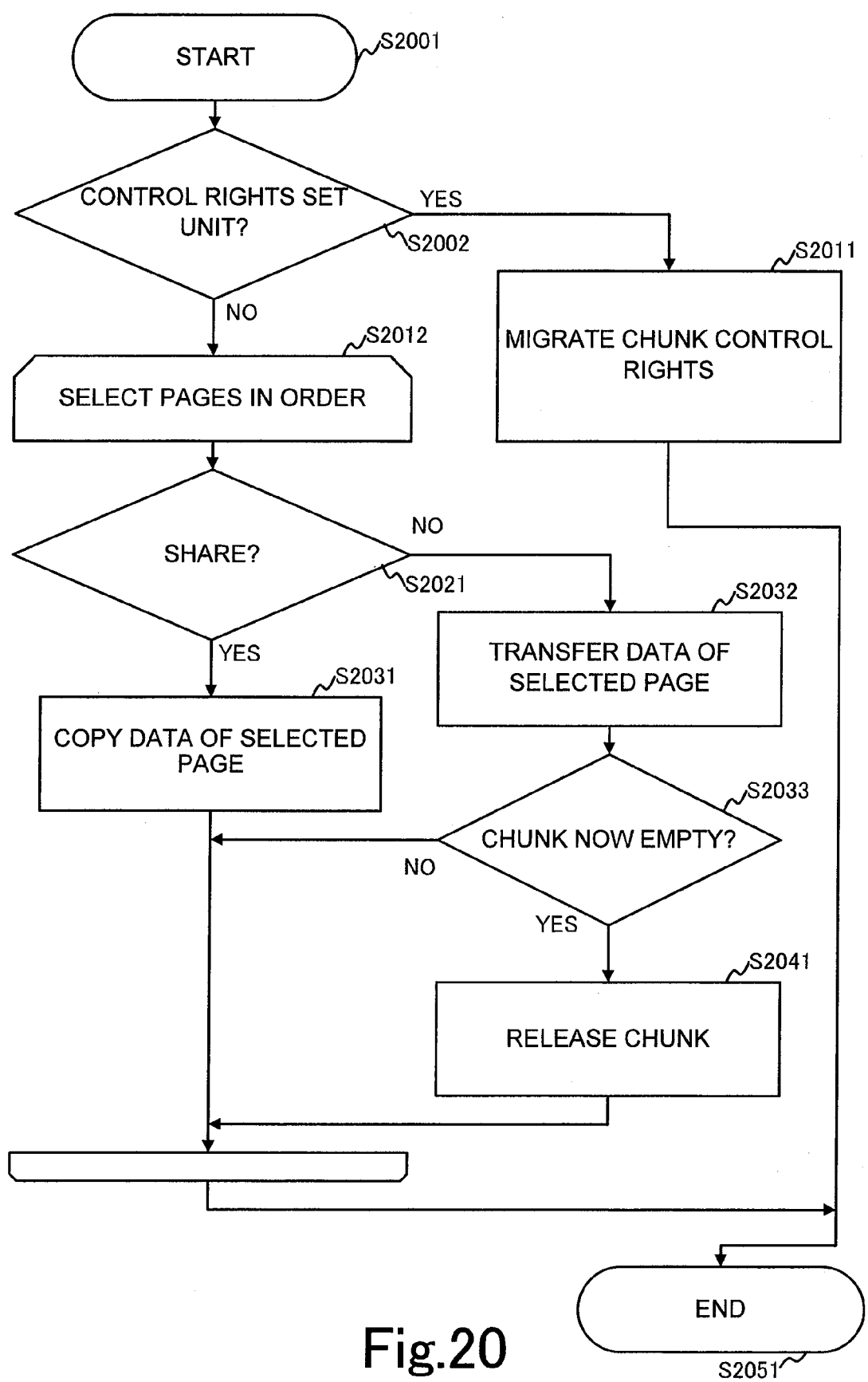
FIG. 20 shows a sequence for processing to migrate control rights.

Due to the loop of S1902, when processing of all the attribute change recommendation pages is complete, the attribute change processing ends (S1941). FIG. 20 shows a sequence for processing to migrate control rights.

By configuring control rights for a logical volume or a certain area thereof and assigning control rights to a certain core, it is ensured that the other cores will not access the corresponding area, exclusion processing is reduced, and a high-speed and simple operation can be performed. In such a storage controller 101, there are cases where the control rights should be changed, such as when the load balance between the CPU cores is lost, or when a user applies a small number of volumes to a certain CPU in order to prioritize processing thereof. In this case, the control rights migration program 227 migrates the control rights. This program 227 is executed by the CPU core to which pre-change (pre-migration) control rights are assigned, for example.

Upon starting the control rights migration processing (S2001), the control rights migration program 227 first judges, using the pool usage LU information table T1301, whether the whole migration processing target group (the LUs or a certain area thereof) is to serve as a control rights set unit (S2002). For example, in a case where the migration processing targets are LU0, LU1, and LU2 in the pool usage LU information table T1301, all the logical storage areas belonging to the control rights set number 0 are the migration processing targets, and hence the judgment of S2002 is true. A control rights set should, where possible, be retained, and settings to that effect should be made. Hence, in a case where the migration processing targets are LU0 and LU1, for example, LU2 is not a migration processing target among all the logical storage areas belonging to the control rights set number 0, and hence the judgment of S2002 is false. This means that the logical storage area group originally belonging to the control rights set number 0 is divided into two to form different control rights sets. For example, the snapshot base volume and the snapshot volumes thereof may refer to the same area, and therefore a state in which these volumes belong to the same control rights set and a link between the cores is unnecessary is preferable. However, in a case where several of the snapshot volumes are re-assigned to another core and separate test processing is to be carried out using these volumes, division of the control rights set is performed.

In a case where the migration processing target group is a control rights set unit, the control rights migration program 227 migrates the control rights of all the chunks belonging to the control rights set to be processed (S2011). For example, when the migration processing targets are LU0, LU1, and LU2 in the pool usage LU information table T1301, the control rights migration program 227 extracts all the assigned chunk numbers belonging to the control rights set number 0 from the control rights set management information table T1401 (chunk numbers 0, 3, 15, 46, 95), and migrates these control rights to another core. S2011 also includes processing to update various management information generated by the migration. Since the control rights are migrated as a result of the S2011, the control rights migration ends (S2051).

In S2002, in a case where the migration processing target group is not the control rights set unit, the program 227 extracts all the pages held by the migration processing target group from the page management information table T1501, and sequentially selects and processes these pages (S2012). First, the program 227 judges whether areas outside the migration processing target group are sharing a selected page (S2021). For example, in a condition where the current states of selected pages are described in the pool usage LU information table T1301, when the migration processing target group is assumed to be LU0 and LU1, all the pages which correspond to the page usage LUNs 0 and 1 and are specified from the page management information table T1501, are the target of S2012. The page numbers are 0, 1, 3, 4, 105, and 315 according to the example in FIG. 15. In addition, when it is judged, likewise from the pool usage LU information table T1301, whether areas outside the migration processing target group are shared, it can be seen that the page numbers 1, 4, and 315 are used only by the LU0 and LU1 and the other areas are not shared, while page numbers 0, 3, and 105 are shared by another area (LU2).

In a case where a selected page is shared by the migration processing target area and a non-target area, the program 227 copies the data of the selected page to a page in a chunk belonging to a migrated control rights set by using the data copy/migration program 224 (S2031). This corresponds to processing in which data is prepared for each control rights set because access from different control rights sets is likely to occur. Naturally, there is also a method in which a data copy is not performed in S2031 and where a state is assumed in which access from different control rights sets is acceptable, and so on. However, the processing is complicated and overhead, caused by the inter-core co-ordination processing, is also generated.

In a case where the migration processing target area and the non-target area do not share the selected page in S2021, the program 227 migrates the data of the selected page to a page in a chunk that belongs to a migrated control rights set by using the data copy/migration program 224 (S2032). This is because the selected page is accessed only by a migrated control rights set, and hence there is no need for corresponding page information to remain in the migration-source control rights set.

Furthermore, S2031 and S2032 are not described in detail but processing to assign a new chunk or page to the migrated control rights set is executed. This processing is the same as that of S1921 in new page assignment processing.

Page migration is performed in S2032, and therefore the page is released after migration. At this time, the program 227 judges whether the chunk including the selected page is empty (S2033), and when the chunk is not empty, selects the next page. When the chunk is empty, the program 227 releases the chunk including the selected page by using the chunk assign/release program 226 (S2041), and selects the next page. As a result of S2041, the number of the released chunk, which is a chunk number belonging to the migration-source control rights set, is deleted from the table T1401 (see FIG. 14).

When the processing of all the pages in S2012 ends, the control rights migration processing ends (S2051).

Various processing relating to chunks, pages, and control rights sets has been illustrated hereinabove using FIGS. 18, 19, and 20. In this processing and in processing of I/O commands (IO processing) from the host 102, an operation in which control rights are considered is focused only on logic for handling chunks, as exemplified by the chunk assign/release program 226. In other words, after a chunk has been assigned on the basis of control rights set information, which is determined by the chunk assign/release program 226, various functions are able to execute processing by assigning pages without considering the control rights. A concept for making the processing of the storage controller 101 faster and simpler known as control rights is accordingly introduced while achieving a simplified logical structure by not considering control rights except for chunk processing.

Figure 23:
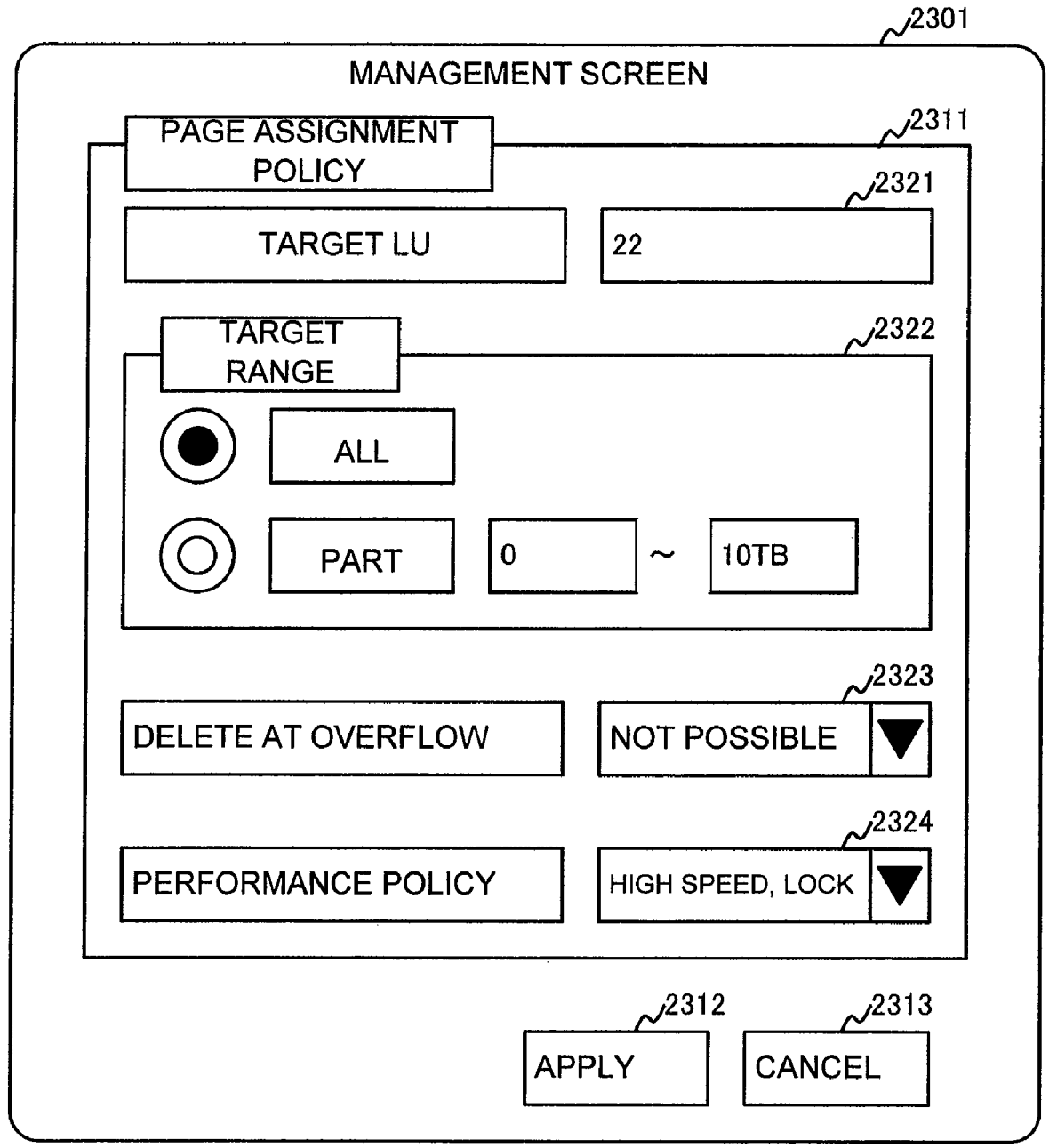
FIG. 23 shows a management screen 2301 for configuring a page assign policy.

FIG. 23 shows a management screen 2301 for configuring a page assign policy.

The management screen 2301 includes a page assign policy configuration part 2311, an apply button 2312, and a cancel button 2313.

The page assign policy configuration part 2311 has a part 2321 for inputting an assignment policy configuration target LU, and a part 2322 for configuring the target range. A range for configuring an assignment policy can be selected from these parts. Furthermore, a part 2323 for electing whether or not deletion is possible when overflow is generated, and a part 2324 for configuring a performance policy are provided. As a result, a page assign policy can be configured for a selected area.

The apply button 2312 is a button for applying various information that is input, and the cancel button 2313 is a button for discarding various input information.

Figure 24:
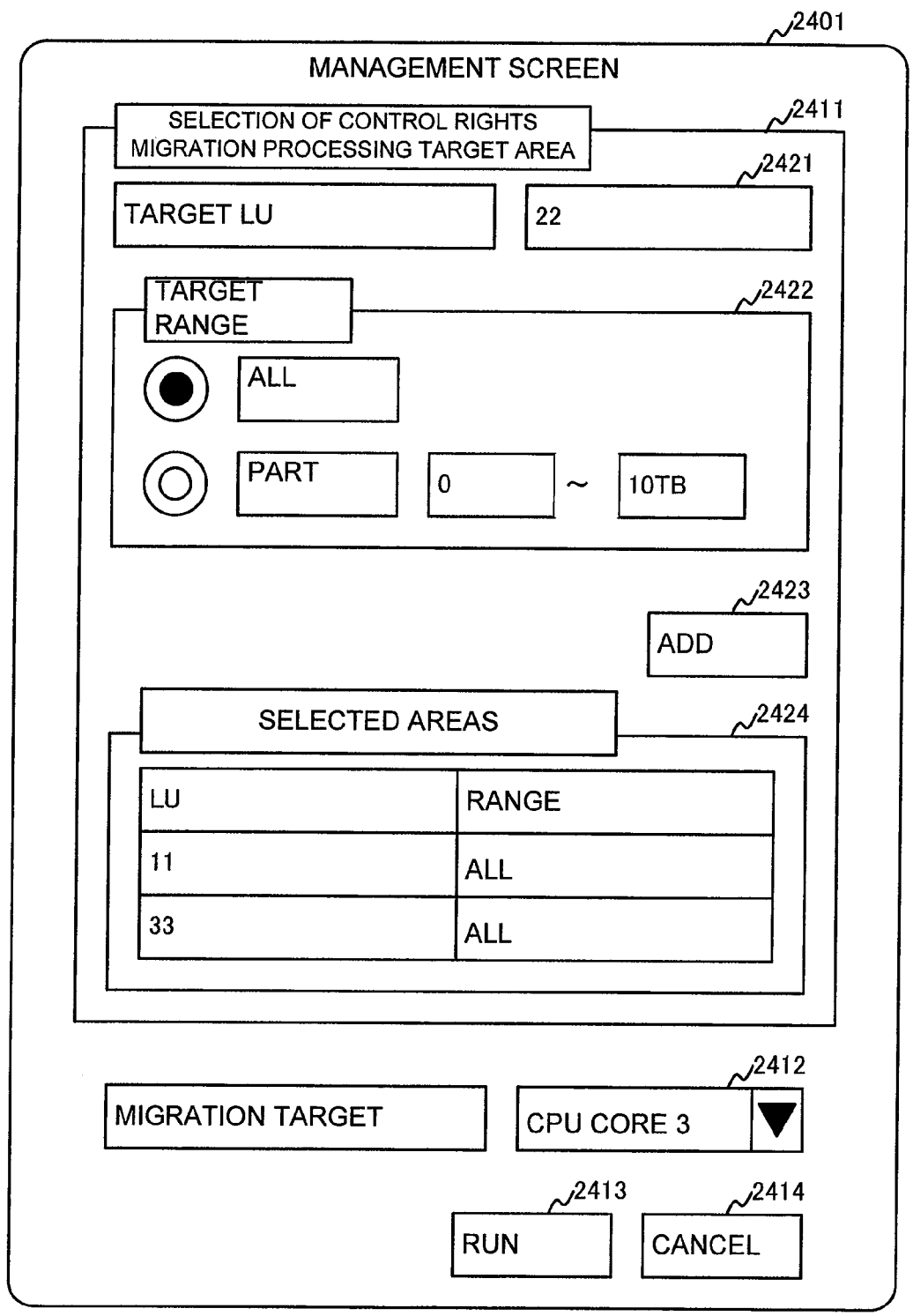
FIG. 24 shows a management screen 2401 for instructing control rights migration processing.

FIG. 24 shows a management screen 2401 for instructing control rights migration processing.

The management screen 2401 includes a control rights migration processing target area selection part 2411, a migration target selection part 2412, a run button 2413, and a cancel button 2414.

The part 2411 is a part for selecting a target range for the control rights migration processing, and the currently selected area is displayed by the selected areas 2424. When an area is added, an area is selected by using the target LU configuration part 2421 and the target range configuration part 2422, and information on the area is added to the selected areas 2424 by pushing an add button 2423.

The part 2412 is a part for selecting which CPU core the selected areas 2424 are assigned to.

The run button 2413 is a button for migrating control rights, for areas displayed by selected areas 2424, to the CPU core displayed by the migration target selection part 2412, and the cancel button 2414 is a button for discarding various information that is input.

In FIG. 24, a screen with which the administrator expressly migrates control rights is shown. However, there also exists a migration method, in which the storage controller is allowed to migrate control rights for each area, judgment is made based on the load balance inside the storage controller 101 and on configuration content from the administrator, and the CPU core automatically migrates the control rights. For example, the CPU core monitors the frequency of access to logical storage areas belonging to control rights sets under its own management, and may, when the access frequency exceeds a certain frequency, migrate control rights under its management.

Several embodiments of the present invention have been described hereinabove but it is understood that the present invention is not limited to these embodiments and that various changes are possible within a scope not departing from the spirit of the invention. For example, Example 2 (chunk configuration and assignment of pages from chunks, for example) may also be applied to Example 1. Further, assigning an area may be performed in a case of a data read to a logical storage area.

The invention claimed is:

1. A storage controller comprising a plurality of Central Processing Unit (CPU) cores,
wherein
the plurality of CPU cores each have control rights for logical storage areas of one or more types among logical storage areas of a plurality of types, and
each of the CPU cores, in a case of a write access to a logical storage area corresponding to the control rights of the CPU cores, assigns an area required to store data according to the write access from a common physical storage area to an access-target logical storage area,
wherein
the logical storage areas of the plurality of types are a plurality of volumes belonging to a plurality of control rights sets,
one or more control rights sets are assigned to each of the CPU cores,
the common physical storage area is a storage area based on a plurality of Redundant Array of Independent (or Inexpensive) Disks (RAID) groups of different attributes,
the RAID groups are configured by a plurality of physical storage devices,
the common physical storage area is configured by a plurality of chunks,
each of the chunks is configured by a plurality of stripe columns,
the stripe columns are configured by a plurality of stripes, and are RAID group-based data I/O unit areas,
the stripes are unit areas in a physical storage device,
one or more chunks assigned from the plurality of chunks belong, in addition to the volumes, to each control rights set,
the CPU core, to which a control rights set of a target volume to which data to be written is assigned:
in operation (A) judges whether or not there is an area capable of storing data in the chunks belonging to the control rights set of the target volume,
in operation (B) if a result of the judgment in the operation (A) is affirmative, judges whether or not there is an area of an attribute conforming to a policy of the target volume,
in operation (C) if a result of the judgment in the operation (B) is affirmative, assigns to the target volume the area of an attribute conforming to the policy of the target volume, and
in operation (D) if the result of the judgment in the operation (A) or operation (B) is negative, assigns a chunk conforming to the policy of the target volume to the control rights set of the target volume, and then assigns an area conforming to the policy of the target volume from the assigned chunk to the target volume,
any of the CPU cores performs control rights migration processing to migrate an assignment destination of, one or more migration target volumes from a first control rights set to a second control rights set, performing in operations (a) to (c) below in the control rights migration processing:
in operation (a) judging whether or not all of the one or more migration target volumes are all of the one or more volumes belonging to the first control rights set;
in operation (b) if a result of the judgment in the operation (a) is affirmative, migrating all the assignment destinations of the one or more migration target volumes from the first control rights set to the second control rights set;
in operation (c) if the result of the judgment in the operation (a) is negative, performing operations (c-1) to (c-5) below for each of the areas assigned to the one or more migration target volumes:
in operation (c-1) judging whether an area has also been assigned to a volume other than the one or more migration target volumes;

in operation (c-2) if a result of the judgment in the operation (c-1) is affirmative, copying data in the area to an area of a chunk belonging to the second control rights set;

in operation (c-3) if the result of the judgment of in the operation (c-1) is negative, migrating data in the area to an area of a chunk belonging to the second control rights set;

in operation (c-4) judging whether or not a chunk including a data migration source area is empty after the operation (c-3); and in operation (c-5) if a result of the judgment in the operation (c-4) is affirmative, releasing the chunk from the first control rights set, and wherein areas of different sizes are mixed in one chunk.

2. The storage controller according to claim 1, wherein the plurality of volumes include a plurality of first-type volumes, which are volumes used in a virtual volume function which is a function carrying out Thin Provisioning capacity virtualization, and a second-type volume used in a function other than the virtual volume function, at least one of the plurality of first-type volumes is adopted as an access target for data to be written to the second-type volume, a target CPU score, which is a CPU core to which a set of control rights for the access-target first-type volume is assigned, assigns an area required to store data according to the write access from the common physical storage area to the access-target first-type volume.

3. The storage controller according to claim 2, wherein a certain CPU core performs overflow prevention processing, which is processing including operations (A) to (C) below:

in operation (A) judging whether or not a usage rate of the common physical storage area exceeds a first threshold value;

in operation (B) deleting a volume in a case where a result of the judgment in the operation (A) is affirmative; and in operation (C) releasing an area of the common physical storage area that has been assigned to the volume deleted in the operation (B).

4. The storage controller according to claim 3, wherein the certain CPU core further performs operation (D) and operation (E) below in the overflow prevention processing:

in operation (D) judging whether or not the usage rate of the common physical storage area has fallen below a second threshold value as a result of the operation (C); and in operation (E) executing the operation (B) if the result of the judgment in the operation (D) is negative, and ending processing if a result of the judgment in the operation (D) is affirmative, and wherein the second threshold value is a lower threshold value than the first threshold value.

5. The storage controller according to claim 2, wherein the target CPU core assigns an area from one or more chunks belonging to the set of control rights for the access-target first-type volume to the access-target first-type volume, and if the one or more chunks do not have an area of a capacity required to store data, adds at least one free chunk to the set of control rights and then assigns the area to the first-type volume from the added chunk.

6. A storage controller comprising a plurality of Central Processing Unit (CPU) cores, wherein the plurality of CPU cores each have control rights for logical storage areas of one or more types among logical storage areas of a plurality of types, and each of the CPU cores, in a case of a write access to a logical storage area corresponding to the control rights of the CPU cores, assigns an area required to store data according to the write access from a common physical storage area to an access-target logical storage area, wherein the logical storage areas of the plurality of types are a plurality of volumes belonging to a plurality of control rights sets, one or more control rights sets are assigned to each of the CPU cores, the common physical storage area is configured by a plurality of chunks, one or more chunks assigned from the plurality of chunks belong, in addition to the volumes, to each control rights set, and each of the CPU cores, to which a control rights set of a target volume to which data is to be written is assigned, assigns an area to the target volume from the one or more chunks belonging to the control rights set.

7. The storage controller according to claim 6, wherein any CPU core performs control rights migration processing to migrate an assignment destination of one or more migration target volumes from a first control rights set to a second control rights set, and in the control rights migration processing, in operation (a) judges whether or not all of the one or more migration target volumes are all of the one or more volumes belonging to the first control rights set, and in operation (b) if a result of the judgment in the operation (a) is negative, performs operations (b-1) to (b-3) below for each of the areas assigned to the one or more migration target volumes:

in operation (b-1) judging whether an area has also been assigned to a volume other than the one or more migration target volumes;

in operation (b-2) if a result of the judgment in the operation (b-1) is affirmative, copying data in the area to an area of a chunk belonging to the second control rights set;

in operation (b-3) if the result of the judgment in operation (b-1) is negative, migrating data in the area to an area of a chunk belonging to the second control rights set.

8. The storage controller according to claim 7, wherein any of the CPU cores, in the control rights migration processing, in operation (b-4) judges whether or not a chunk that includes a data migration source area is empty after the operation (b-3), and in operation (b-5) if a result of the judgment of in the operation (b-4) is affirmative, releases the chunk from the first control rights set.

9. The storage controller according to claim 6, wherein the CPU core, to which the control rights set of the target volume is assigned, in operation (A) judges whether or not there is an area capable of storing data in the chunks belonging to the control rights set of the target volume, in operation (B) if a result of the judgment in the operation (A) is affirmative, assigns an area to the target volume from a chunk which belongs to the control rights set of the target volume, and in operation (C) if the result of the judgment in the operation (A) is negative, adds any free chunk to the control rights set for the target volume and then assigns an area to the target volume from the added chunk.

10. The storage controller according to claim 6, wherein areas of different sizes are mixed in one chunk.

11. The storage controller according to claim 6, wherein
the plurality of volumes include a virtual volume, a snapshot volume and a snapshot virtual volume;
the virtual volume and the snapshot volume among the virtual volume, the snapshot and the snapshot virtual volumes are host device volumes;
the virtual volume is a volume which is a data storage destination from a host device;
the snapshot volume is a volume which stores differential data from a snapshot base volume which stores data as a base;
data stored in the snapshot volume is stored in the snapshot virtual volume;
each of the CPU cores to which a set of control rights for the virtual volume is assigned, in the case of a write access to the virtual volume, assigns an area required to store data according to the write access from the one or more chunks belonging to the set of control rights;
each of the CPU cores to which a set of control rights for the snapshot volume is assigned, in the case of write access to the snapshot volume, writes data according to the write access to the snapshot virtual volume;
the CPU core to which a set of control rights for the snapshot virtual volume is assigned, in the case of write access to the snapshot virtual volume, assigns an area required to store data according to the write access from the one or more chunks belonging to the set of control rights.

12. The storage controller according to claim 6, wherein
the plurality of volumes include a plurality of first-type volumes, which are volumes used in a virtual volume function which is a function carrying out Thin Provisioning capacity virtualization, and a second-type volume used in a function other than the virtual volume function,
at least one of the plurality of first-type volumes is adopted as an access target for data to be written to the second-type volume,
a target CPU core, that is one of the CPU cores to which a set of control rights for the access-target first-type volume is assigned, assigns an area required to store the data according to the write access on the access-target first-type volume from the one or more chunks belonging to the set of control rights.

13. The storage controller according to claim 12, wherein
a certain CPU core performs an overflow prevention process which includes the following operations (A) to (C):
in operation (A) determining if usage rate of the common physical storage area exceeds a first threshold value;
in operation (B) deleting volumes if a result of the above operation (A) determination is affirmative;
in operation (C) releasing an area in the common physical storage area that was assigned in the deleted volumes in the above operation (C), and
the usage rate is a total ratio of the assigned area for the capacity of the common physical storage area.

14. The storage controller according to claim 13, wherein
a certain CPU core performs an overflow prevention process which includes the following operations (D) to (E):
in operation (D) determining whether the usage rate of the common physical storage area is less than a second threshold value as a result of the above operation (C);
in operation (E) executing the above operation (B) if a result of the above operation (D) determination is negative, and terminate process if a result of the above operation (D) determination is affirmative, and
the second threshold value is lower than the first threshold value.

15. The storage controller according to claim 6, wherein
the common physical storage area is a storage area based on a RAID group; the RAID group is comprised of a plurality of physical storage devices; each of the plural chunks is comprised of plural stripe lines;
each stripe line is comprised of plural stripes and I/O unit area of data based on the RAID group;
each stripe is a unit area in the physical storage device, and areas of different sizes are mixed in one chunk.

16. The storage controller according to claim 12, wherein when the target CPU core assigns the area on the access-target first-type volume from one or more chunks belonging to a set of control rights for the access-target first-type volume, if there is no capacity area required to store data in the one or more chunks, at least one free chunk is assigned for the set of control rights and thereafter, an area required to store data is assigned for the first-type volume from the assigned chunk.

17. A storage controlling method by a storage controller, wherein the storage controller has a plurality of CPU cores, plural types of logical storage areas, and common physical storage areas on one or more logical storage areas among the plural types of logical storage areas, the plural types of logical storage areas have a plurality of volumes belonging to plural sets of control rights and the common physical storage areas are comprised of plural chunks, and
the storage controlling method has the following steps of:
assigning one or more chunks among the plural chunks on each of the plural sets of control rights;
assigning one or more sets of control rights on each of the plural CPU cores; when receiving a write access, a CPU core to which a set of control rights for the target volume in which data according to the write access is to be written assigns an area required to store the data from one or more chunks belonging to the set of control rights.

* * * * *